(12) United States Patent
Azzopardi et al.

(10) Patent No.: US 12,448,478 B2
(45) Date of Patent: Oct. 21, 2025

(54) METHOD FOR THE SYNTHESIS OF AN AUXETIC POLYURETHANE FOAM WITH A DEFINED CELL STRUCTURE AND AUXETIC POLYURETHANE FOAM OBTAINABLE BY THE METHOD

(71) Applicant: SMART MATERIALS LIMITED, St. Paul's Bay (MT)

(72) Inventors: Keith Mario Azzopardi, Swieqi (MT); Matthew Anthony Xuereb, Birkirkara (MT); Ruben Gatt, Rabat (MT)

(73) Assignee: SMART MATERIALS LIMITED, St. Paul's Bay (MT)

( * ) Notice: Subject to any disclaimer, the term of this patent is extended or adjusted under 35 U.S.C. 154(b) by 0 days.

(21) Appl. No.: 17/918,054

(22) PCT Filed: Apr. 15, 2021

(86) PCT No.: PCT/EP2021/059827
§ 371 (c)(1),
(2) Date: Oct. 10, 2022

(87) PCT Pub. No.: WO2021/209568
PCT Pub. Date: Oct. 21, 2021

(65) Prior Publication Data
US 2023/0192938 A1    Jun. 22, 2023

(30) Foreign Application Priority Data
Apr. 15, 2020   (NL) ...................................... 2025349

(51) Int. Cl.
| | |
|---|---|
| *C08G 18/38* | (2006.01) |
| *C08G 18/16* | (2006.01) |
| *C08G 18/20* | (2006.01) |
| *C08G 18/24* | (2006.01) |
| *C08G 18/32* | (2006.01) |
| *C08G 18/48* | (2006.01) |
| *C08G 18/66* | (2006.01) |
| *C08G 18/76* | (2006.01) |
| *C08J 9/02* | (2006.01) |
| *C08J 9/12* | (2006.01) |

(52) U.S. Cl.
CPC ....... *C08G 18/3893* (2013.01); *C08G 18/165* (2013.01); *C08G 18/2063* (2013.01); *C08G 18/244* (2013.01); *C08G 18/3206* (2013.01); *C08G 18/4837* (2013.01); *C08G 18/6677* (2013.01); *C08G 18/7621* (2013.01); *C08J 9/02* (2013.01); *C08J 9/125* (2013.01); *C08G 2110/0058* (2021.01); *C08G 2110/0066* (2021.01); *C08G 2110/0083* (2021.01); *C08G 2280/00* (2013.01); *C08J 2201/022* (2013.01); *C08J 2203/10* (2013.01); *C08J 2205/05* (2013.01); *C08J 2375/08* (2013.01)

(58) Field of Classification Search
CPC .......................... C08G 18/165; C08G 18/2063; C08G 18/244; C08G 18/3206; C08G 18/3893; C08G 18/4837; C08G 18/6677; C08G 18/7621; C08G 2110/0058; C08G 2110/0066; C08G 2110/0083; C08G 2280/00; C08J 9/02; C08J 9/125; C08J 2201/022; C08J 2203/10; C08J 2205/05; C08J 2375/08
See application file for complete search history.

(56) References Cited

U.S. PATENT DOCUMENTS

| | | | |
|---|---|---|---|
| 4,176,218 A | 11/1979 | Demou et al. | |
| 5,844,012 A | 12/1998 | Petrella et al. | |
| 2017/0129146 A1 * | 5/2017 | Zeng | ....................... B29C 67/20 |
| 2020/0039124 A1 | 2/2020 | Zeng et al. | |

FOREIGN PATENT DOCUMENTS

| | | | | |
|---|---|---|---|---|
| CA | 3103345 A1 * | 1/2020 | ........... | C08G 18/244 |
| CN | 1986621 A | 6/2007 | | |
| CN | 106687270 A | 5/2017 | | |
| CN | 107474303 A | 12/2017 | | |
| PL | 221936 B1 * | 6/2016 | | |
| WO | WO-2010049511 A2 * | 5/2010 | ........... | B29C 44/357 |
| WO | 2016014782 A1 | 1/2016 | | |
| WO | WO-2019053143 A1 * | 3/2019 | ........... | B29C 44/357 |

OTHER PUBLICATIONS

International Search Report and Written Opinion dated May 12, 2021, for Application No. PCT/EP2021/059827 (12 pages).
International Preliminary Report on Patentability dated Jul. 26, 2022 for Application No. PCT/EP2021/059827 (five (5) pages).

* cited by examiner

*Primary Examiner* — John M Cooney
(74) *Attorney, Agent, or Firm* — KDW Firm PLLC

(57) ABSTRACT

A method for the synthesis of an auxetic polyurethane foam with a defined cell structure and an auxetic polyurethane foam substrate obtainable by a method according to the invention. The method includes mixing a polyol reagent and a foaming reagent, forming a reaction mixture, mixing an isocyanate with the reaction mixture, compressing and/or contracting the isocyanate/reaction mixture, and allowing the compressed and/or contracted isocyanate/reaction mixture to cure.

15 Claims, 13 Drawing Sheets

METHOD FOR THE SYNTHESIS OF AN AUXETIC POLYURETHANE FOAM WITH A DEFINED CELL STRUCTURE AND AUXETIC POLYURETHANE FOAM OBTAINABLE BY THE METHOD

"This application is a national stage filing under 35 U.S.C. 371 of pending International Application No. PCT/EP2021/059827, filed Apr. 15, 2021, which claims priority to Netherlands Patent Application No. 2025349, filed Apr. 15, 2020, the entirety of which applications are incorporated by reference herein."

The present invention relates to a method for the synthesis of an auxetic polyurethane foam with a defined cell structure and an auxetic polyurethane foam substrate obtainable by the method according to the invention.

Polyurethane foam is one of the most widespread, modern-day materials. It is used in many applications, in particularly when cushioning, impact reduction, filtering, sound absorption, vibration absorption, is desired.

An auxetic polyurethane foam is a material which becomes wider when stretched and narrower when squashed. Conventional methods to synthesise auxetic polyurethane foam comprises thermomechanical processes.

Furthermore, these conventional methods to produce auxetic polyurethane foam comprise a conversion step. The conversion step starts with a conventional foam block which then undergoes either thermo-mechanical and/or chemo-mechanical processing, followed by repeatedly compressing, either bi-axially or tri-axially, heating, and cooling the foam. Such process involves a solvent in addition to axial pressure. Both processing steps employ axial pressure, which buckles the struts present in the cells of the foam, and whilst the foam is cooling/drying, changes the shape of the cells.

One of the problems of the known method to synthesise auxetic polyurethane foam is that it is not a scalable chemical synthesis. In addition, in practice one is confronted with the conventional thermomechanical processes experience limitations in the scalable synthesis.

The present invention aims to provide a method that obviates or at least reduces one or more of the aforementioned problems and to enable efficient and effective synthesis of an auxetic polyurethane foam with a defined cell structure.

This objective is achieved with the method for the synthesis of an auxetic polyurethane foam with a defined cell structure according to the invention, comprising the steps of:
  a. mixing a polyol reagent and a foaming reagent, forming a reaction mixture;
  b. mixing an isocyanate with the reaction mixture;
  c. compressing and/or contracting the reaction mixture of step b; and
  d. allowing to cure the compressed reaction mixture of step b.

It will be understood that auxetic behaviour is the result of the controlled contraction and/or compression of the polyurethane foam during synthesis, for example before allowing curing the compressed reaction mixture. Controlled contraction and/or compression before completion of polymer curing results in a permanent change to the cellular structure of a polyurethane foam such that the defined cell structure of an auxetic polyurethane foam is achieved.

In the present application 'foaming reagent' refers to a reagent which enables a reaction mixture to foam, which means it facilitates the formation of foam, and thus enables the reaction mixture to expand and polymerise.

In the present application 'compression' refers to compressing the reaction mixture.

In the present application 'contraction' refers to forming the polymer network by contracting the reaction mixture due to the cooling of the (foamed) mixture and/or the presence of closed cells within the (foamed) mixture that are a result of the polymer network. In other words, contraction relates to the shrinkage of the reaction mixture without the use of external devices. Furthermore, contraction relates to volumetric shrinkage achieved without the application of external forces to the reaction mixture In the present application 'auxetic polyurethane foam' refers to a polyurethane foam comprising a cellular structure that allows it to exhibit a negative Poisson's ratio.

In the present application 'reaction mixture' refers to the mixture which is subject to physical change. In other words, the reaction mixture refers to all stages of the mixture before the polymer is fully chemically cross-linked and physically cured.

In the present application 'defined cell structure' refers to the cell structure of the auxetic foam.

In the present application 'mould' refers to a container in which the reaction mixture is allowed to expand.

In the present application 'mixing container' refers to the container the reagents are mixed in, and include reaction vessel, reactor, flask and the like.

It is noted that the mould may be used to contract or compress the reaction mixture.

The defined cell structure comprises polyurethane foam cells that have ribs which are protruding inwards and/or outwards as a result of the compression and/or contraction applied during synthesis of the auxetic polyurethane foam.

Furthermore, the auxetic properties are a result of the kinks in the ribs, together in which the ribs deform. Taking the Kelvin cell as the representative of conventional polyurethane foam, one would need to impart kinks within the constituent ribs to obtain auxetic properties.

Therefore, the defined cell structure comprises of a cell with buckled ribs, wherein the buckling of the ribs may be obtained by contraction of the foam, compression by an external force or a combination of both. Contraction of the foam may be achieved by relaxation of expansion stresses, thermal stresses resulting from the cooling of the foam and/or the presence of closed cells within the foam.

For example, the defined cell structure comprises polyurethane foam cells that have cellular ribs or struts which are protruding inwards and/or outwards as a result of the compression and/or contraction applied during synthesis of the auxetic polyurethane foam. The cellular structure is said to be bent, kinked, convoluted and/or buckled. Therefore, the defined cell structure of an auxetic polyurethane foam according to the invention comprises a cell with buckled ribs, wherein the buckling of the ribs may be obtained by contraction of the foam, compression by an external force or a combination of both.

The method for the synthesis of an auxetic polyurethane foam with a defined cell structure according to the invention comprises two phases, the mixing phase and the curing phase. In the mixing phase all the reagents are mixed which contribute to the synthesis of the auxetic polyurethane foam with a defined cell structure. The curing phase comprises the chemical reactions which allow to achieve the desired microstructure of the auxetic polyurethane foam with a defined cell structure.

In a preferred embodiment according to the invention, the method further comprises the steps of:

(i) initiating the reaction mixture of step b, wherein step (i) is performed before step c;
(ii) expansion and rising of the initiated reaction mixture of step (i); and
(iv) finalising of cross-linking and curing, wherein step (iv) is a sub-step of step d.

These further substeps of steps b and d contribute to the efficiency and effectiveness of the method.

The curing phase, also referred to as forming phase, comprises one or more of the steps:
(i) initiating the reaction mixture of step b;
(ii) expansion and rising of the initiated reaction mixture of step (i);
(iii) compressing and/or contracting the reaction mixture of step (i) and/or (ii), wherein step (iii) is also referred to as step (c); and
(iv) finalising of cross-linking and curing, wherein step (iv) is a sub-step of step d.

It will be understood that contraction relates to the shrinkage of the reaction mixture without the use of external devices.

In a preferred embodiment according to the invention, the curing phase further comprises the step of pouring the reaction mixture onto a moving conveyer as part of a continuous line. Said step is performed between step (iii) and step (iv).

It is noted that initiating the reaction comprises the start of the foam synthesis. Furthermore, it is noted that the mixing phase and curing phase may overlap.

Initial reactions and expansion and rise constitute the blowing and gelling reactions of expansion and/or foaming process, for example one-shot foaming process, and therefore forming the initial cellular structure. In other words, this defines a process in which one starts from chemical/foaming reagents to a final, cured auxetic polyurethane foam in a single process without the need of any further post-processing steps. Post processing means further treatment to the foam after curing has been completed.

The present invention comprises a compression and/or contraction process of the initial cellular structure to achieve the desired defined cell structure prior to finalisation of chemical cross-linking and physical curing of the reaction mixture. In a preferred embodiment according to the invention, this order of compression and/or contraction of the cellular structure provides the permanent formation of the defined cellular structure of the auxetic polyurethane foam.

Yet another advantage of the method according to the invention is that the method according to the invention may be a one-shot foaming process or one-shot shot foam synthesis. In other words, the foaming synthesis is performed in a single reactor. This reduces the spillage of (valuable) starting material.

In a preferred embodiment, the method for the synthesis of an auxetic polyurethane foam with a defined cell structure according to the invention starts with mixing a polyol reagent and a foaming reagent, forming a reaction mixture. Mixing the polyol reagent and the foaming agent has the advantage that a homogeneous mixture is achieved. A homogeneous reaction mixture is preferred in order to provide an efficient and effective auxetic polyurethane foam with a defined cell structure.

The step of forming the reaction mixture, step a, is followed by step b, wherein an isocyanate is mixed with the reaction mixture. Mixing the reaction mixture of step a and isocyanate has the advantage that a reaction mixture suitable for forming auxetic polyurethane foam is achieved.

Step b is followed by step c, compressing and/or contracting the reaction mixture of step b. The reaction mixture may be poured into a mould or a container before step c is performed, by the step of pouring the reaction mixture of step b into a mould or a container. In other words, the reagents may also be mixed in the mould or container. Compressing and/or contracting the reaction mixture allows the reaction mixture of step b to cure during step d, allowing curing the compressed reaction mixture of step b achieves the auxetic polyurethane foam according to the invention.

Compressing and/or contracting the reaction mixture induces the change from the initial cellular structure of polyurethane foam to the defined cellular structure of an auxetic polyurethane foam.

Compressing and/or contracting the reaction mixture of step b may be performed by internal forces and/or external forces. The internal forces may occur during the synthesis of auxetic polyurethane foam. The external forces may be applied by a compressing device, for example a clamp, seal of the mould, gas compressor, a mould or mixing container having one or more walls that can move independently or concurrently, pistons, and the like. The external forces may provide a mould/container which may be pressurised and/or vacuumed.

It will be understood that compression and/or contraction may be aided by the use of friction-reducing devices such as lubricants, bristles, crushed paper, auxetic structures, origami structures, and the like.

Preferably, the compression and/or contraction of the reaction mixture of step b is performed by internal forces. This results in the desired contraction without the use of additional manufacturing steps and/or additional compression equipment.

In an alternative preferred embodiment, contraction and/or compression of the reaction mixture may be controlled by the choice of mould or container and the choice of chemical constituents in the reaction mixture. The internal forces contributing to this contraction may result from internal stresses created at the polymer-bubble interface during expansion of the reaction mixture and/or thermal stresses. The elastic energy resulting from the transmission of these stresses may then allow the flexible polymer chains to achieve a more favourable conformation that ultimately result in a change of the initial cellular structure to the defined cellular structure.

In yet another alternative preferred embodiment, contraction during the synthesis of an auxetic polyurethane foam according to the invention may be achieved by cooling gas trapped inside the foam due to the presence of closed cells. Said approach may be combined with other techniques to obtain contraction and/or applying (external) compression by compressing devices.

In an alternative preferred embodiment, the compression of the reaction mixture of step b is performed by external forces or a combination of internal and external forces. An advantage of applying internal and/or external forces, such as compression and/or contraction is that the properties and/or performance of the synthesis of the auxetic polyurethane foam may be tuned. For example, the method according to the invention enables to tune the properties and/or performance of the auxetic polyurethane foam to obtain the desired foam. Furthermore, the degree of compression and/or contraction applied to the reaction mixture will be reflected in the degree of convolution of the defined cellular structure. Control of the compression and/or contraction enables to tune the (end) properties of the auxetic polyurethane foam. For example, the Young's modulus of the resultant auxetic polyurethane foam is affected by the degree of applied compression and/or contraction. Thus, the method according to the invention enables a wide range of auxetic polyurethane foam substrates with various properties and perfomances. Said polyurethane foams may be used in specific applications. As a result, an auxetic polyurethane foam on demand may be achieved.

The degree of compression and/or contraction is derived by recording the initial volume of the foam after expansion and recording the final volume after compression. These two values may provide a percentage of volume shrinkage or 'degree' of shrinkage and/or compression and/or contraction.

A further advantage is that compression and/or contraction may be enabled inside and/or outside the mould or mixing container.

In a further preferred embodiment, the external compression may be provided by introducing an additional pressurised gas, applying uniaxial/multiaxial stresses, and/or in a flowing/pushing the reaction mixture through a continuous line.

The continuous line comprises a channel which has a volume smaller than the original auxetic polyurethane foam. The flowing/pushing of the reaction mixture thru the continuous line is performed before the curing process is finished. For example, the continuous line may be a continuous line in which uniaxial stresses or multiaxial stresses are applied rather than just the tunnel with reduced volumes.

The advantage of introducing an additional pressurised gas, applying uniaxial/multiaxial stresses, and/or in a flowing/pushing the reaction mixture through a continuous line is that compression or assist of the compression caused by the internal contraction is achieved and the auxetic polyurethane foam with the defined cell structure is obtained.

An advantage of a continuous line process is that the external compression may be provided by for example, flowing and/or pushing the reaction mixture through a channel which has a volume smaller than the initial volume of the reaction mixture. The flowing and/or pushing of the reaction mixture through the continuous line may be performed before the curing process is finalised.

The curing of the reaction mixture of step b starts to occur before compression and/or contraction and mainly occurs after contraction. Preferably, the curing of the reaction mixture of step b occurs substantially after compression and/or contraction. Substantially curing after compression and/or contraction has the advantage that an auxetic polyurethane foam is achieved of which the defined cellular structure is permanent.

The method for the synthesis of an auxetic polyurethane foam according to the invention provides the synthesis of the foam wherein the structure of the foam is substantially formed before the polymerisation is fully performed and the polymer fully cured.

After step d, the auxetic polyurethane foam will substantially return to its original form when released from a tensorial or compression force. A further advantage is that upon impact, the materials of the polyurethane foam moves towards the zone of the impact, making the foam denser in that area.

An advantage of the method for the synthesis of an auxetic polyurethane foam with a defined cell structure is that thermoplastic processes used to produce a converted foam are avoided. The thermoplastic processes include thermo-mechanical and chemo-mechanical conversion processes. As a result, further manufacturing processes such as purchasing and/or producing the conventional polyurethane foam, cutting the foam to specified dimensions, fitting the foam into moulds to compress it, applying heat and/or immersion into solvents and cooling and/or drying are prevented. Furthermore, the method according to the invention provides compression and heat. As a result the use of external equipment is reduced, such as external heating and/or cooling.

Another advantage of the method for the synthesis of an auxetic polyurethane foam with a defined cell structure is that the method eliminates size restriction, for example size restrictions due to the manufacturing process, of the auxetic polyurethane foam. As a result different shapes and dimensions of foam may be achieved and auxetic polyurethane foam with a defined cell structure may be applied in bullets, mattresses, hard plastic, padding, and the like. Furthermore, the method according to the invention provides an economical, effective and efficient synthesis of the auxetic polyurethane foam with a defined cell structure.

Yet another advantage of the method according to the invention is that the post-process heating and compression steps are integrated into the one-shot foaming process. Therefore, the need to perform a tedious step after the synthesis of the polyurethane foam is reduced and thus a more economical method is achieved.

Furthermore, it was found that the method according to the present invention provides a scalable chemical synthesis of auxetic polyurethane foam. This is mainly due to the fact that the process obviates the steps of post-process heating and compressing and/or that the size restriction in the manufacturing is obviated. This enables the large-scale synthesis of the polyurethane foam according to the invention. In addition, the method according to the invention enables large scale synthesis of auxetic polyurethane foams.

After step (ii), expansion and rising of the initiated reaction mixture of step (i), compression and/or contraction of the reaction mixture is performed. It is noted that compression and/or contraction of the reaction mixture allows the cellular ribs or struts of the initial cellular structure to bend, kink, convolute and/or buckle in a uniform manner, forming the defined cellular structure of the final auxetic polyurethane foam. The compression and/or contraction may be performed whilst the processes of cross-linking and/or curing are on-going. This enables the compressed reaction mixture to achieve a permanent, homogeneous defined cellular structure within the polyurethane foam according to the invention.

In yet another preferred embodiment according to the invention, the method according to the invention enables substantially curing after compression and/or contraction. As a result, the inter-molecular ordering between the polymer chains is fully or partially disrupted prior to the application of compression and/or contraction. The enables that phase separation of polyurea chains is limited or avoided such that these polymer chains remain dissolved or partially dissolved in a soft segment of the reaction mixture. Furthermore, the method for the synthesis of an auxetic polyurethane foam according to the invention limits the concentration, molecular weight build-up and ordering of the polyureas into hard segment domains.

Preferably, the method according to the invention provides an auxetic polyurethane foam with a defined cell structure wherein the defined cell structure of the auxetic polyurethane foam comprises a closed cell content of at most 50% measured according to mercury porosimetry or gas physisorption. In a further preferred embodiment the defined cell structure of the auxetic polyurethane foam comprises a closed cell content of at most 30%, more preferably a closed cell content of 10%, measured according to mercury porosimetry or gas physisorption.

Another advantage of the method for the synthesis of an auxetic polyurethane foam according to the invention is that the inter-molecular ordering between the polymer chains is disrupted. As a result, the polymer chain may be dissolved in a soft segment of the auxetic polyurethane foam for a prolonged amount of time. The polymer chain may be for example polyurethane.

Furthermore, the method for the synthesis of an auxetic polyurethane foam according to the invention limits the concentration and molecular weight of the polyureas.

Another advantage of the method for the synthesis of an auxetic polyurethane foam according to the invention is that a defined cell structure may be achieved by cooling the gas trapped inside the foam. Cooling down the gas which is trapped inside the foam provides the desired volume shrinkage.

The defined cell structure is analysed by light microscopy and scanning electron microscopy.

In another preferred embodiment according to the invention, the level of gelation of the polymer ribs of the foam provides cell convolution wherein the polymer is unable to flow and have provided expansion. Preferably, the ribs are strong enough to withstand internal stresses created at the polymer-bubble interface during foam expansion. These surface stresses are transmitted to the polymer and cause it to buckle.

In another preferred embodiment according to the invention, the step of mixing a polyol reagent and a foaming reagent, step a, is followed by step b, wherein the addition of an isocyanate to form a reaction mixture. Mixing the reaction mixture of step a has the advantage that a reaction mixture suitable for forming homogenous auxetic polyurethane foam is achieved. This step is followed by rising of the reaction mixture (that is caused by foaming of mixture) to form the initial cellular structure of a polyurethane foam.

In a preferred embodiment according to the invention, the foaming reagent is one or more selected from the group of a blowing catalyst, a blowing agent, a gelling catalyst, a surfactant, a chain extender, a cross-linker.

It will be understood that throughout the application chain extender and cross-linker may be used interchangeably. Preferably, a cross-linker comprises three or more reactive sites and a chain extender comprises two or more reactive sites. Therefore, some of the chain extenders may classify as a cross-linker.

Providing one or more selected from the group of a blowing catalyst, a blowing agent, a gelling catalyst, a surfactant, a chain extender, a cross-linker has the advantage that auxetic polyurethane foam may be achieved on demand, with the desired properties. In addition, this is further improved by the applied temperature, humidity, and mould material.

In a preferred embodiment the foaming agent comprises a surfactant and a blowing agent. Experiments showed that such combination provided good auxetic polyurethane foam.

Alternatively, the foaming agent comprises a surfactant, a blowing agent, and blowing catalyst. Experiments showed that such combination provided good auxetic polyurethane foam.

In another alternative embodiment the foaming agent comprises a blowing catalyst, a blowing agent, a gelling catalyst, a surfactant, a chain extender, and a cross-linker. Experiments showed that such combination provided good auxetic polyurethane foam. Preferably the chain extender comprises a functionality of two or more.

Furthermore, the foaming agent may further comprise an additive such as a colourant, a flame retardant, a cell coarsener. Adding an additive provides an auxetic polyurethane foam with a look and feel demanded by a customer. For example, the colour of the auxetic polyurethane foam may be customised, or the auxetic polyurethane foam may be provided with flame retardant properties.

In a further preferred embodiment according to the invention, the method comprises adding water to the reaction mixture before step b.

An advantage of adding water to the reaction mixture before step b is that the isocyanate and water react with each other. One of the reaction products of this reaction is carbon dioxide ($CO_2$). The $CO_2$ may be used as a blowing agent which is formed in situ. As a result the amount of (external) added blowing agent may be reduced. Preferably, the water added to the reaction mixture before step b is ultra pure water.

Furthermore, water may act a blowing agent. Therefore, a polyurethane foam is achieved comprising a blowing agent which is cost effective and readily available.

In an alternative embodiment, dichloromethane is added together with or instead of the water to the reaction mixture before step b. Experiments showed that an efficient and effective auxetic polyurethane foam was achieved.

In a further preferred embodiment according to the invention, the steps a and b are independently performed by vigorously agitating, wherein vigorously agitating comprises a rotation speed, and wherein the rotation speed for each of the steps a and b is in the range of 10 rotations per minute (rpm) to 5000 rpm, preferably in the range of 20 rpm to 4000 rpm, more preferably in the range of 30 rpm to 3000 rpm.

Performing the steps a and b by independently vigorously agitating provides a homogeneous reaction mixture. As a result a uniform and homogeneous auxetic polyurethane foam may be achieved.

The mixing of the reagents may be performed using an impeller, for example a four blade impeller, stirrer bar, shaker, and the like.

It will be understood that different reagents may be added separately to the polyol reagent.

In a further preferred embodiment according to the invention, steps c and d are performed in a mould thereby providing an auxetic polyurethane foam.

Performing the steps b and c in a mould provide the desired shape and allow to compress the reaction mixture of step b and cure the compressed reaction mixture. The mould may be a single container or an area in a continuous process such as a continuous (compressible) line.

In yet another preferred embodiment, the reaction mixture of step b may be transferred to a mould or left inside the mixing container thereby providing an auxetic polyurethane foam in the mixing container.

In other words, the mixing container and mould are one and the same.

The mould or mixing container may be purposely developed, shaped and/or adapted to provide a controlled environment for the reaction mixture (i.e. control of the internal space of the mixing container and/or mould). To that end, the mould or mixing container may be built from a thermal insulator such as expanded polystyrene or any other insulating material. This can also be achieved by using heating and/or cooling devices. The advantage of using heaters and/or coolers is that the temperature may be changed over time to achieve and/or maintain at desired temperature profile. The desired temperature profile may for example be a thermal equilibrium between the core of reaction mixture and the edges of the reaction mixture. Additionally, use of friction-reducing devices such as lubricants, bristles, origami structures, collapsible structures, auxetic structures, ball bearings and the like may further improve the quality of the auxetic polyurethane foam. Mould design is of optimum importance to achieve homogeneity in the defined cellular structure of the auxetic polyurethane foam according to the invention.

In a further preferred embodiment according to the invention, step a is performed for at most 8 hour, preferably for at most 4 hours, more preferably for at most 1 hour, and wherein step a is performed at a temperature of less than 100° C., preferably less than 80° C., more preferably in the range of 20° C. to 80° C.

Experiments showed that performing step a for at most 8 hour, preferably for at most 4 hours, more preferably for at most 1 hour, and wherein step a is performed at a temperature of less than 100° C., preferably less than 80° C., more preferably in the range of 20° C. to 80° C. provided good results.

Further experiments showed that step a may also be performed at a temperature in the range of −10° C. to 80° C.1

In a further preferred embodiment according to the invention, step b is performed between 1 second to 130 seconds, preferably between 2 seconds to 120 seconds.

Performing step b between 1 second to 130 seconds, preferably between 2 seconds to 120 seconds provided the reaction mixture of step b efficiently and effectively.

In a further preferred embodiment according to the invention, the adding of water to the reaction mixture before step b is performed under vigorously agitating between 1 second to 40 minutes, preferably between 2 seconds to 35 minutes, more preferably between 3 seconds to 30 minutes.

It was found that adding of the water to the reaction mixture before step b performed under vigorously agitating between 1 second to 40 minutes, preferably between 2 seconds to 35 minutes, more preferably between 3 seconds to 30 minutes, provided a good reaction mixture of step a comprising added water.

In an alternative embodiment, the adding of the water to the reaction mixture before step b is performed vigorously agitating between 3 seconds to 10 minutes. It was found that adding of the water to the reaction mixture before step b alternatively performing under vigorously agitating between 3 seconds to 10 minutes, provided a good reaction mixture of step a comprising added water.

In a further preferred embodiment according to the invention, the polyol reagent is one or more selected from the group of polyether polyol, polyester polyol, polyamine polyol, polyamide polyol, polythioester polyol, polythioether polyol, solid support polyol.

In an alternative embodiment, the polyol reagent is one or more selected from the above mention group with polyol reagents and/or from the group polybutadiene polyols, polysiloxane polyols, vegetable-oil polyols, soy-bean polyols, flame-retardant polyols, solid-grafted polyols such as polyurea dispersion (PHD) polyols and polyisocyanate polyaddition (PIPA) polyols. The flame-retardant polyols may comprise a chlorine, bromine and/or phosphorus.

Experiments showed that when the polyol reagent is one or more selected from the group of polyether polyol, polyester polyol, polyamine polyol, polyamide polyol, polythioester polyol, polythioether polyol, solid support polyol, provided the desired auxetic polyurethane foam.

In a further preferred embodiment according to the invention, the isocyanate of formula I is provided

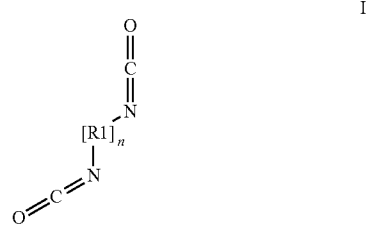

wherein $R_1$ comprises an alkyl group and/or aromatic group, and wherein the isocyanate is one or more selected from the group of tolylene-2,4-diisocyanate, tolylene-2,6-diisocyanate, methylene diphenyl diisocyanate, p-phenylene diisocyanate, dicyclohexylmethane diisocyanate, 1,5-naphthylene diisocyanate, O-tolidine diisocyanate, isophorone diisocyanate.

Providing the isocyanate according to formula I, an preferably wherein the isocyanate is one or more selected from the group of tolylene-2,4-diisocyanate, tolylene-2,6-diisocyanate, methylene diphenyl diisocyanate, p-phenylene diisocyanate, dicyclohexylmethane diisocyanate, 1,5-naphthylene diisocyanate, O-tolidine diisocyanate, isophorone diisocyanate provided good reactivity between the foaming reagent and the isocyanate.

Experiments showed that a preferred embodiment comprises water and the isocyanate of formula I, preferably wherein the isocyanate is one or more selected from the group of tolylene-2,4-diisocyanate, tolylene-2,6-diisocyanate, methylene diphenyl diisocyanate, p-phenylene diisocyanate, dicyclohexylmethane diisocyanate, 1,5-naphthylene diisocyanate, O-tolidine diisocyanate, isophorone diisocyanate. These experiments provided the desired auxetic polyurethane foam.

In a further preferred embodiment according to the invention, the blowing catalyst comprises a tertiary amine, wherein the tertiary amine is one or more selected from the group of triethylenediamine, 1,3,5-tris-(3-[dimethyl-amino] propyl)-hexa-hydro-1,3,5-triazine, bis(2-dimethylaminoethyl)ether, N,N-dimethylcyclohexylamine, 2,2'-dimorpholinodiethylether, N,N-dimethylethanolamine, N,N-dimethylaminoethoxyethanol, N,N,N',N'',N''-pentamethyldiethylenetriamine, N,N-dimethylaminoethoxyethanol, 2,2'-dimorpholinodiethylether, N,N'-dimethylpiperazine.

It was found that a blowing catalyst comprising a tertiary amine, wherein the tertiary amine is one or more selected from the group of triethylenediamine, 1,3,5-tris-(3-[dimethyl-amino]propyl)-hexa-hydro-1,3,5-triazine, bis(2-dimethylaminoethyl)ether, N,N-dimethylcyclohexylamine, 2,2'-dimorpholinodiethylether, N,N-dimethylethanolamine, N,N-dimethylaminoethoxyethanol, N,N,N',N'',N''-pentamethyldiethylenetriamine, N,N-dimethylaminoethoxyethanol, 2,2'-dimorpholinodiethylether, N,N'-dimethylpiperazine, provided the desired auxetic polyurethane foam.

In a further preferred embodiment according to the invention, the blowing agent is one or more selected from the group of water, chlorofluorocarbons (CFCs), hydrochlorofluorocarbons (HCFCs), hydrofluorocarbons (HFCs), hydrocarbons, isopentane, cyclopentane, nitrogen, argon, carbon dioxide, helium, xenon, neon, air.

In addition to or instead of the in situ formed carbon dioxide the blowing agent is one or more of the foaming reagents may be a chlorofluorocarbons, hydrochlorofluorocarbons, hydrofluorocarbons, hydrocarbons, isopentane, cyclopentane, nitrogen, argon, carbon dioxide, helium, xenon, neon, air. Adding such blowing agent may control the curing process resulting in the auxetic polyurethane foam according to the invention.

The blowing agent may be one or more selected from the group of 1,1,1,4,4,4-hexafluorobutane, such as pentane, such as dichloromethane and 1,1-Dichloro-1-fluoroethane, (CFCs) such as trichlorofluoromethane, dichlorodifluoromethane.

In a further preferred embodiment according to the invention, the gelling catalyst comprises an organometallic catalyst, wherein the organometallic catalyst is one or more selected from the group of stannous octoate, stannous neodecanoate, dibutyltindilaurate, potassium acetate. Preferably, the surfactant is siloxane derivatives and/or oxylkylene derivatives.

In a further preferred embodiment according to the invention, the chain extender and/or cross-linker is one or more selected from the group of alcohols, amines, alkoxysilanes, thiols and thioesters. Preferably, wherein the chain extender and/or cross-linker is one or more selected from the group of glycerol, diethanolamine, triethanolamine, ethylene-oxide capped trimethylolpropane, 2-(methylamino)ethanol, ethylene glycol, methyltrimethoxysilane, dimethoxydimethylsilane.

As mentioned above, the chain extender and cross-linker may be the same.

The invention also relates to an auxetic polyurethane foam substrate obtainable by the method according to the invention, wherein the auxetic polyurethane foam comprises a Poisson's ratio in the range of −3 to 0, preferably in the range of −2 to 0, more preferably in the range of −1 to 0.

The auxetic polyurethane foam substrate obtainable by the method according to the invention provides similar effects and advantages as described in relation to the method for the synthesis of an auxetic polyurethane foam with a closed cell structure according to the invention.

It will be understood that the Poisson's ratio may comprise a range of −3 to substantially 0, preferably in the range of −2 to substantially 0, more preferably in the range of −1 to substantially 0.

The Poisson's ratios of the foam samples were determined/measured using a tensile loading machine (Testometric, UK) having a 100 kg F load cell (S/N 31,931), equipped with a duly calibrated camera videoextensometer (Messphysik, Germany). Both tensile and compressive strains were carried out using strain rate control at a rate of 10 mm min$^{-1}$. Measurements, through video extensometry, were taken for the length (l) and width (t) of the foam, which were appropriately marked for the Messphysik pattern recognition software. Three transverse widths ($w_1$-$w_3$) and one axial length ($l_1$) were recorded for each foam sample. As much as possible, the transverse width measurements were taken from the centre of the specimen in order to reduce any edge effects present. The engineering transverse strains were then calculated, averaged, and plotted against the axial strain. This results in a single engineering transverse strain versus axial strain, from which the engineering Poisson's ratio was calculated for the initial strain as the negative of the slope of the graph, assuming linearity in the initial region. For the initial Poisson's ratios, the square of the Pearson product moment correlation coefficient ($R^2$) was also calculated.

In a preferred embodiment according to the invention, the auxetic polyurethane foam comprising a total pore volume in the range of 5 to 100 cm$^3$ g$^{-1}$, preferably in the range of 5 to 50 cm$^3$ g$^{-1}$, more preferably in the range of 5 to 25 cm$^3$ g$^{-1}$, and an overall average cell size in the range of 0.001 to 5.0 millimetres, preferably in the range of 0.01 to 2.0 millimetres, more preferably in the range of 0.01 to 1.5 millimetres.

The total pore volume of the polyurethane foam with the method according to the invention is derived by analysis of light microscopy or scanning-electron microscopy images.

An advantage of the auxetic polyurethane foam substrate according to the invention is that the foam specifications may be customised, and that the auxetic polyurethane foam substrate is not isotropic (non-isotropic) or isotropic. It was found that the Poisson's ratio of the auxetic polyurethane foam substrate manufactured according to the method of the invention may vary depending on the orientation of the foam as required.

In a preferred embodiment according to the invention, the auxetic polyurethane foam substrate comprises closed cells, preferably wherein the auxetic polyurethane foam comprises 0% to 30% closed cells, more preferably the auxetic polyurethane foam comprises 0% to 10% closed cells. Preferably, the auxetic polyurethane foam substrate has a glass-transition temperature of at most 180° C. or less, preferably a glass-transition temperature of at most 140° C. or less, more preferably a glass-transition temperature of at most 100° C. or less, most preferably a glass-transition temperature of at most 80° C. or less.

An advantage of the auxetic polyurethane foam substrate according to the invention is that the formation of a polyurea network is prevented. As a result the glass-transition temperature is at most 180° C. or less, preferably a glass-transition temperature of at most 140° C. or less, more preferably a glass-transition temperature of at most 100° C. or less, most preferably a glass-transition temperature of at most 80° C. or less.

In a preferred embodiment according to the invention, the auxetic polyurethane foam substrate density is in the range of 10 kg m$^{-3}$ to 300 kg m$^{-3}$, more preferably the auxetic polyurethane foam substrate density is in the range of 20 kg m$^{-3}$ to 200 kg m$^{-3}$, even more preferably the auxetic polyurethane foam substrate density is in the range of 30 kg m$^{-3}$ to 180 kg m$^{-3}$, and most preferably the auxetic polyurethane foam substrate density is in the range of 50 kg m$^{-3}$ to 150 kg m$^{-3}$.

In a preferred embodiment according to the invention, the weight average molecular weight of the auxetic polyurethane foam substrate is in the range of 10000 g mol$^{-1}$ to 1000000 g mol$^{-1}$, preferably the weight average molecular weight of the auxetic polyurethane foam substrate is in the range of 10000 g mol$^{-1}$ to 500000 g mol$^{-1}$, more preferably the weight average molecular weight of the auxetic polyurethane foam substrate is in the range of 20000 g mol$^{-1}$ to 250000 g mol$^{-1}$, most preferably the weight average molecular weight of the auxetic polyurethane foam substrate is in the range of 30000 g mol$^{-1}$ to 150000 g mol$^{-1}$.

The invention also relates to the use of the auxetic polyurethane foam substrate obtainable by the method according to the invention. The auxetic polyurethane foam substrate may be used as personal protective equipment, for example shock absorbing and/or cushioning equipment, e.g. helmet pads, knee pads, elbow pads, and the like, footwear pads for peak pressure dissipation, and seating and supporting cushioning.

Furthermore, the auxetic polyurethane foam substrate obtainable by the method according to the invention may be used as foam for bed mattresses (against bedsores), printer ink cartridge foam, foam for car manufacturing (e.g. saloon bolstering), for a filter, and for sound absorption.

Further advantages, features and details of the invention are elucidated on the basis of preferred embodiments thereof, wherein reference is made to the accompanying figures, in which.

Figure 1:
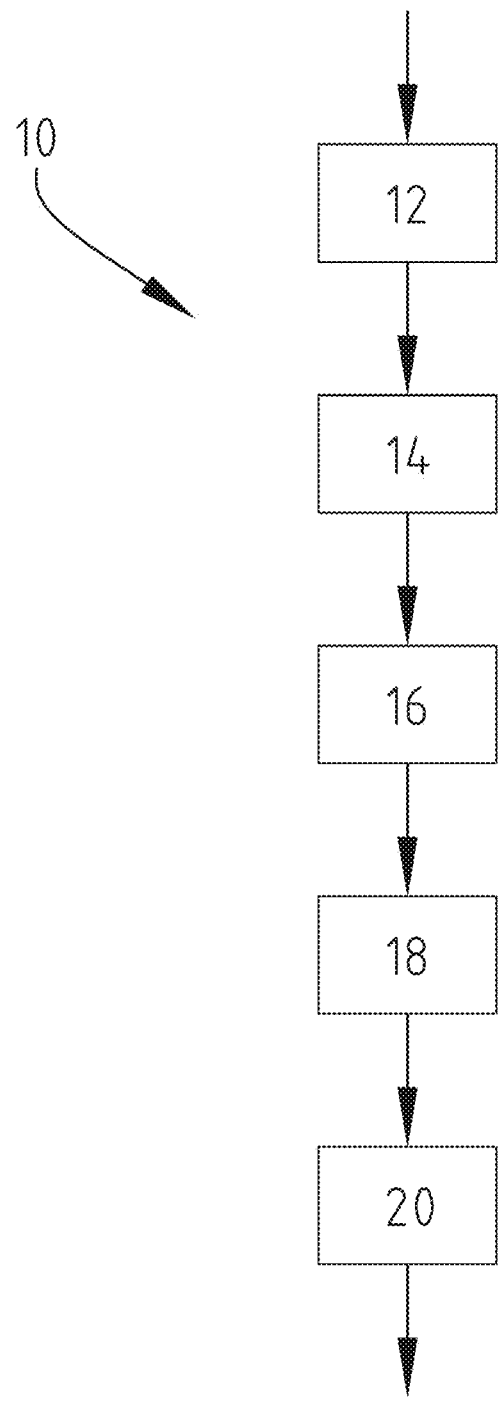
FIG. 1 shows a schematic overview of the method according to the invention.

Method 10 (FIG. 1) comprises the synthesis of an auxetic polyurethane foam with a defined cell structure. Method 10 comprises step 12, also referred to as step a, wherein step 12 includes mixing a polyol reagent and a foaming reagent, forming a reaction mixture. Step 12 may be followed by step 14, wherein step 14 comprises adding water to the reaction mixture before step b.

Step 12 or step 14 is followed by step 16, also referred to as step b, wherein step 16 includes mixing an isocyanate with the reaction mixture. The reaction mixture of step 16 may rise in an appropriate mould or container. Furthermore, the reaction mixture of step 16 is compressed in step 18, also referred to as step c, wherein compressing the reaction mixture of step b is performed.

The synthesis of the auxetic polyurethane foam further comprises the step 20, also referred to as step d, which follows step 18. Step 20 comprises allowing to cure the compressed reaction mixture of step b.

For the experiments and throughout the application, Arcol 1107 comprises a trifunctional inactive propylene oxide/ethylene oxide polyether polyol with hydroxyl number of 46-50 mg KOH/g and a molecular weight of 3500 Da, Kosmos 29 comprises tin-(II)-isooctoate, tegoamine 33 comprises 33% triethylenediamine dissolved in diethylene glycol, Desmodur T80 comprises a blend of two isomers: 80% by wt. 2,4-toluene diisocyanate and 20% by wt. 2,6-toluene diisocyanate.

Figure 2:
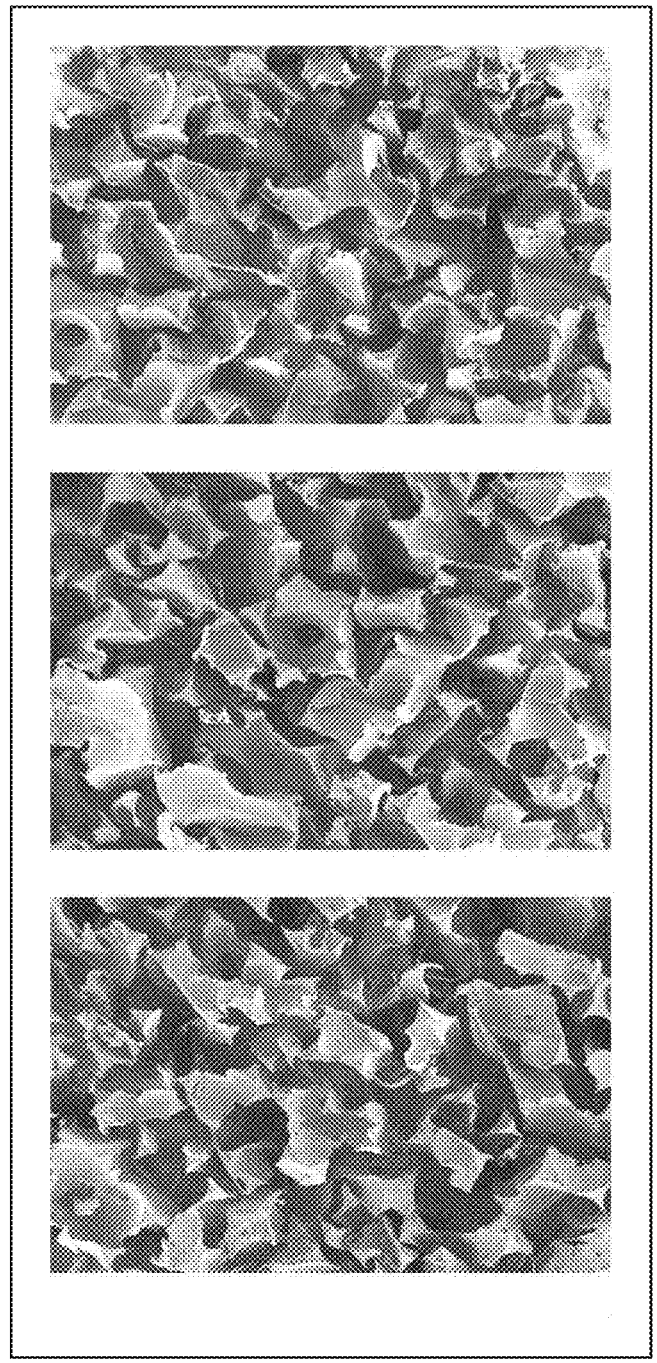
FIG. 2 shows a micrograph of the auxetic polyurethane foam achieved by experiment 1.
Figure 5:
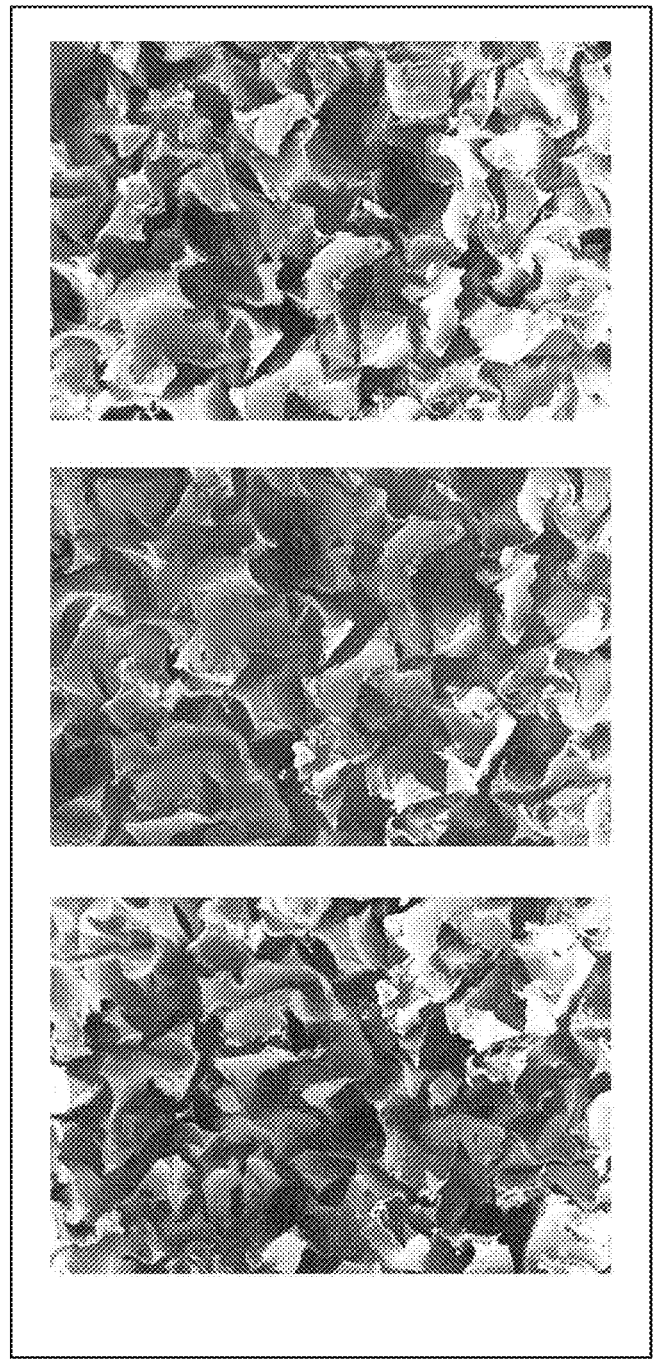
FIG. 5 shows a micrograph of the auxetic polyurethane foam achieved by experiment 2.

For the images of FIGS. 2 and 5 a ZEISS Merlin 42-16 Scanning Electron Microscope was used. Samples were cut with a razor and sputter-coated with a thin-layer of gold before observation. Magnifications used are between 70 and 80× and electron beam had an energy of 8 kV.

In a preferred embodiment according to the invention experiment 1 was performed. The used reagents and amount are provided in Table 1.

The polyol, surfactant, gelling catalyst, blowing catalyst, and chain extender were added to a 1 litre beaker at 25° C., providing a reaction mixture. The blowing agent was added to the reaction mixture and stirred for 5 minutes at 500 rpm at 25° C. To the resulting reaction mixture isocyanate was added, and the mixture was stirred for 20 seconds at 500 rpm at 25° C.

The resulting mixture was poured in a mould, wherein the mould was made of expanded polystyrene, had dimensions of 20 cm×20 cm×30 cm, and a wall thickness of 3.5 cm. The mixture was left in the mould for 24 hours and for four days to cure outside the mould. No external compression of the reaction mixture was performed and it was allowed to contract. The contraction was achieved by the formation of polymer network(s) in the foam, thus leading to shrinkage of the foam.

The obtained auxetic polyurethane foam substrate comprises foam outer dimensions after complete shrinkage and curing of 15.5 cm×15.5 cm×20 cm, a density of 145 kg m$^{-3}$, a Poisson's ratio of 0.54±0.09 in compression, a tensile strip of Poisson's ratio −0.44±0.05 up to 10% strain, a Young's Modulus in tension of 15.63 kPa, a Young's Modulus in compression up to 5% strain of 17.19 kPa.

TABLE 1 reagents used in experiment 1

| Reagent | Description of reagent | Amount (part by weight) |
| --- | --- | --- |
| polyol | Arcol 1107 | 400.5 gram |
| surfactant | Tegostab BF 2370 | 10.0038 pphp* |
| gelling catalyst | Kosmos 29 | 0.1025 pphp* |
| blowing catalyst | Tegoamine 33 | 0.097 pphp* |
| chain extender | Anhydrous Glycerol | 0.304 pphp* |
| blowing agent | Ultra-pure Water | 1.75 pphp* |
| isocyanate | Desmodur T80 | 160 gram |

*pphp = parts per hundred grams of polyol by weight

FIG. 2 shows a micrograph of the auxetic polyurethane foam achieved by experiment 1.

Figure 3:
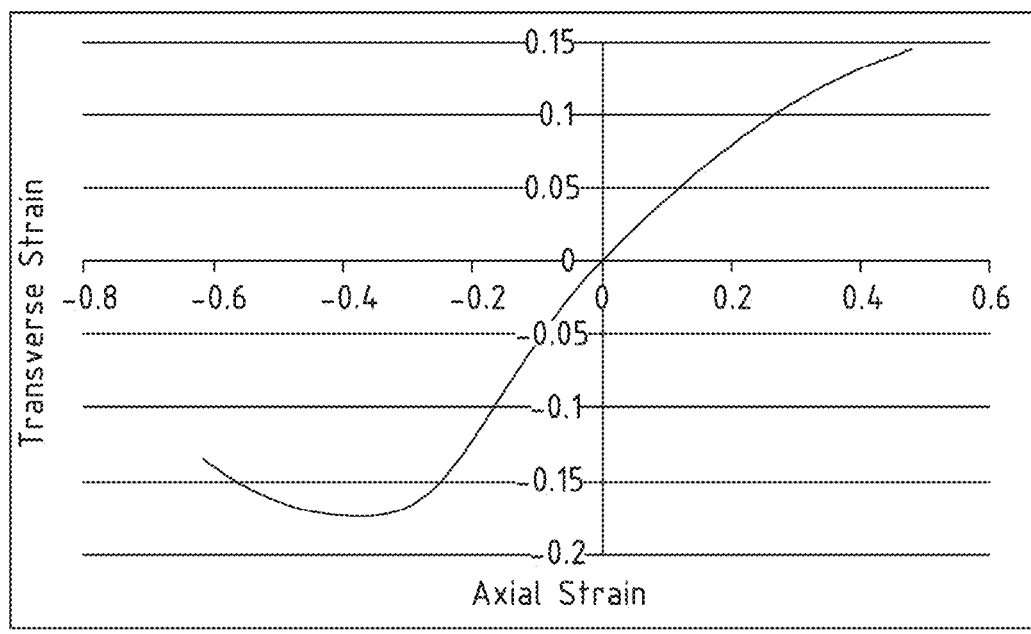
FIG. 3 shows axial strain versus transverse strain of the auxetic polyurethane foam achieved by experiment 1.
Figure 4:
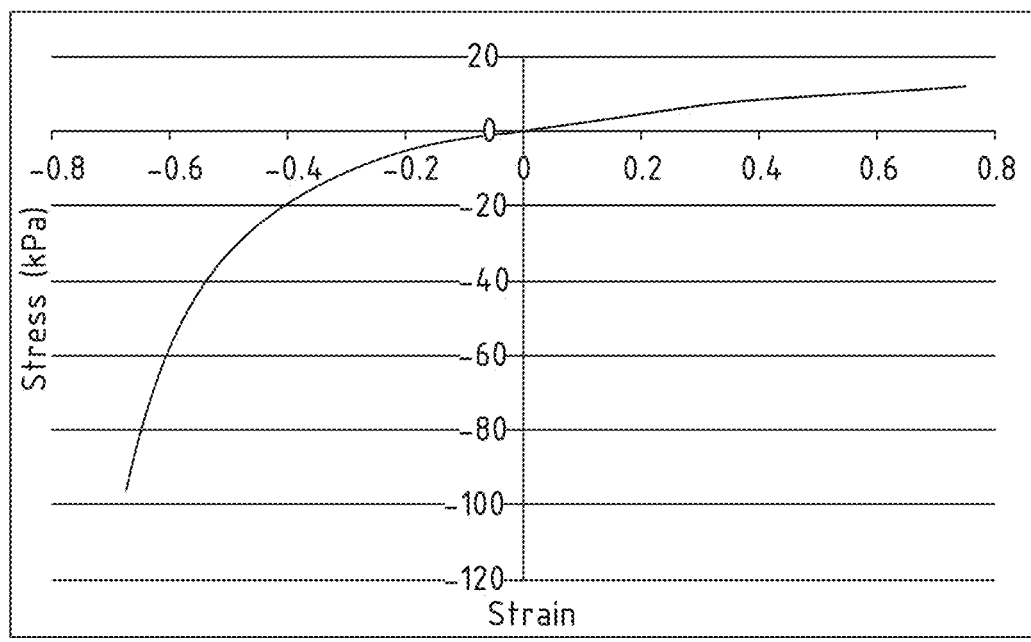
FIG. 4 shows strain versus stress of the auxetic polyurethane foam achieved by experiment 1.

FIG. 3 shows the axial strain versus transverse strain of the auxetic polyurethane foam achieved by experiment 1, and FIG. 4 shows the strain versus stress (kPa) auxetic polyurethane foam achieved by experiment 1. kPa refers to kilo Pascal.

In a preferred embodiment according to the invention experiment 2 was performed. The used reagents and amount are provided in Table 2.

The polyol, surfactant, gelling catalyst, blowing catalyst, and chain extender were added to a 1 litre beaker at 25° C., providing a reaction mixture. The blowing agent was added to the reaction mixture and stirred for 5 minutes at 500 rpm at 25° C. To the resulting reaction mixture isocyanate was added, and the mixture was stirred for 20 seconds at 500 rpm at 25° C.

The resulting mixture was poured in a mould, wherein the mould was made of expanded polystyrene, had dimensions of 20 cm×20 cm×30 cm, and a wall thickness of 3.5 cm. The mixture was left in the mould for 24 hours and for four days to cure outside the mould. No external compression of the reaction mixture was performed and it was allowed to contract. The contraction was achieved by the formation of polymer network(s) in the foam, thus leading to shrinkage of the foam.

The obtained auxetic polyurethane foam substrate comprises foam outer dimensions after complete shrinkage and curing of 12 cm×12 cm×20.5 cm, a density of 205 kg m$^{-3}$, a tensile strip of Poisson's ratio −0.28±0.02 up to 10% strain, a Young's Modulus in tension of 13.66 kPa.

TABLE 2 reagents used in experiment 2

| Reagent | Description of reagent | Amount (part by weight) |
|---|---|---|
| polyol | Arcol 1107 | 400.1 gram |
| surfactant | Tegostab BF 2370 | 10.00875 pphp* |
| gelling catalyst | Kosmos 29 | 0.10075 pphp* |
| blowing catalyst | Tegoamine 33 | 0.1 pphp* |
| chain extender | Anhydrous Glycerol | 0.2085 pphp* |
| blowing agent | Ultra-pure Water | 1.75 pphp* |
| isocyanate | Desmodur T80 | 172.6 gram |

*pphp = parts per hundred grams of polyol by weight

FIG. 5 shows a micrograph of the auxetic polyurethane foam achieved by experiment 2.

Figure 6:
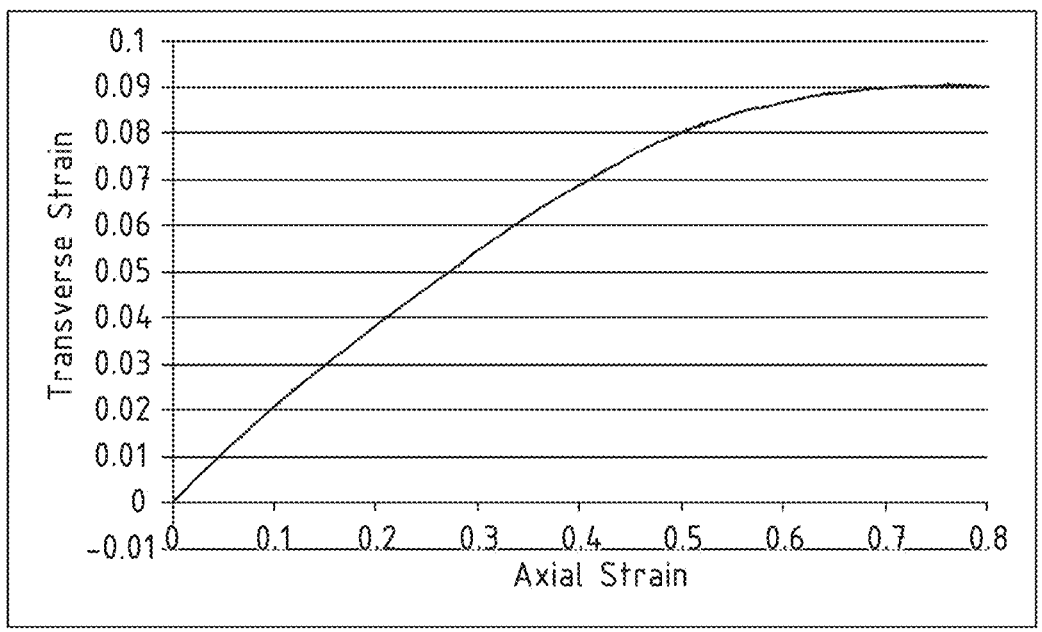
FIG. 6 shows axial strain versus transverse strain of the auxetic polyurethane foam achieved by experiment 2.
Figure 7:
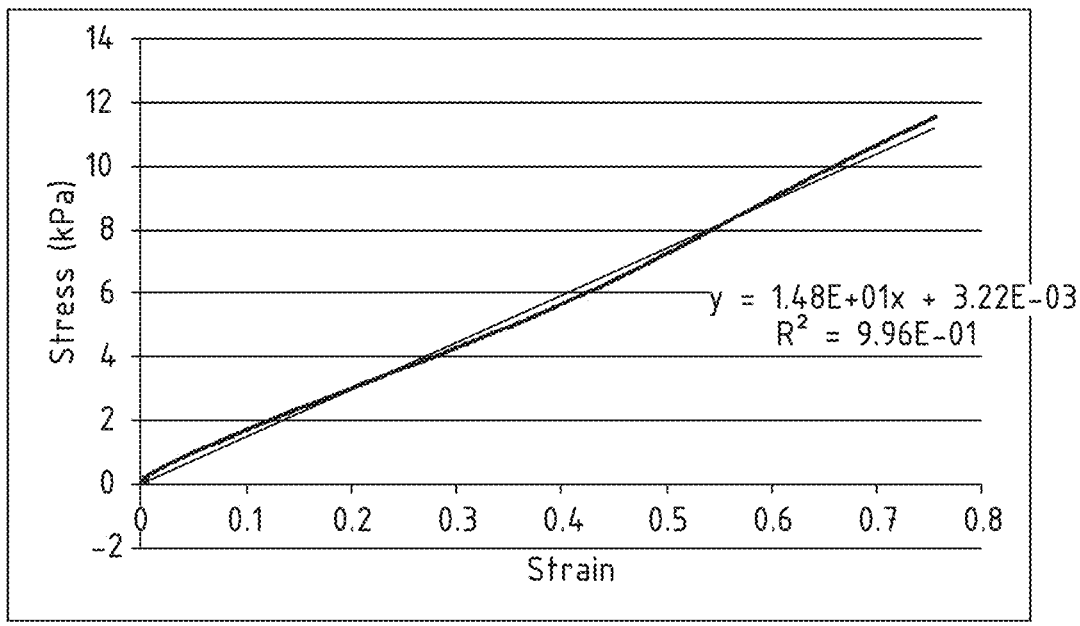
FIG. 7 shows strain versus stress of the auxetic polyurethane foam achieved by experiment 2.

FIG. 6 shows the axial strain versus transverse strain of the auxetic polyurethane foam achieved by experiment 2, and FIG. 7 shows the strain versus stress (kPa) auxetic polyurethane foam achieved by experiment 2. kPa refers to kilo Pascal. FIG. 7 comprises a trend line with the formula of y=14.8x+0.00322 and $R^2$=0.996.

In a preferred embodiment according to the invention experiment 3 was performed. The used reagents and amount are provided in Table 3.

The polyol, surfactant, gelling catalyst, blowing catalyst, and chain extender were added to a 1 litre beaker at 25° C., providing a reaction mixture. The blowing agent was added to the reaction mixture and stirred for 5 minutes at 500 rpm at 25° C. To the resulting reaction mixture isocyanate was added, and the mixture was stirred for 20 seconds at 500 rpm at 25° C.

The resulting mixture was poured in a mould, wherein the mould was made of expanded polystyrene, had dimensions of 20 cm×20 cm×30 cm, and a wall thickness of 3.5 cm. The mixture was left in the mould for 24 hours and for four days to cure outside the mould. No external compression of the reaction mixture was performed and it was allowed to contract. The contraction was achieved by the formation of polymer network(s) in the foam, thus leading to shrinkage of the foam.

The obtained auxetic polyurethane foam substrate comprises foam outer dimensions after complete shrinkage and curing of 15.5 cm×15.5 cm×21 cm, a density of 117 kg m$^{-3}$, a Poisson's ratio of −0.43 in compression up to 15% strain, a tensile strip of Poisson's ratio −0.177±0.006 up to 10% strain, a Young's Modulus in compression of 32.72 kPa up to 5% strain, a Young's Modulus in tension of 19.36 kPa.

TABLE 3 reagents used in experiment 3

| Reagent | Description of reagent | Amount (part by weight) |
|---|---|---|
| polyol | Arcol 1107 | 400.5 gram |
| surfactant | Tegostab BF 2370 | 10.0038 pphp* |
| gelling catalyst | Kosmos 29 | 0.1015 pphp* |
| blowing catalyst | Tegoamine 33 | 0.0997 pphp* |
| chain extender | Anhydrous Glycerol | 0.50425 pphp* |
| blowing agent | Ultra-pure Water | 1.75 pphp* |
| isocyanate | Desmodur T80 | 158.8 gram |

*pphp = parts per hundred grams of polyol by weight

Figure 8:
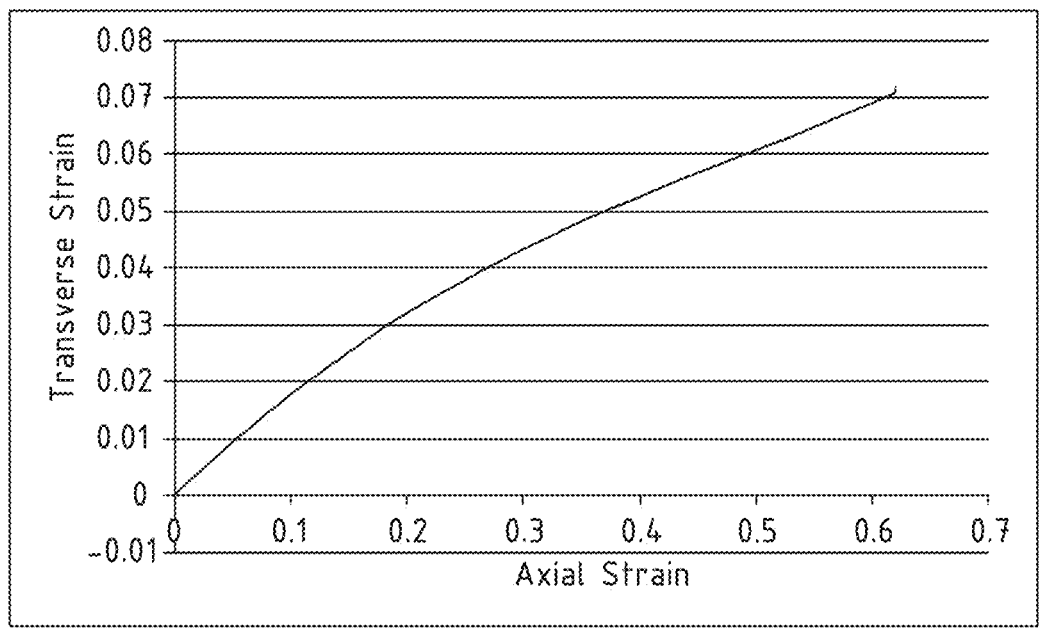
FIG. 8 shows axial strain versus transverse strain of the auxetic polyurethane foam achieved by experiment 3.
Figure 9:
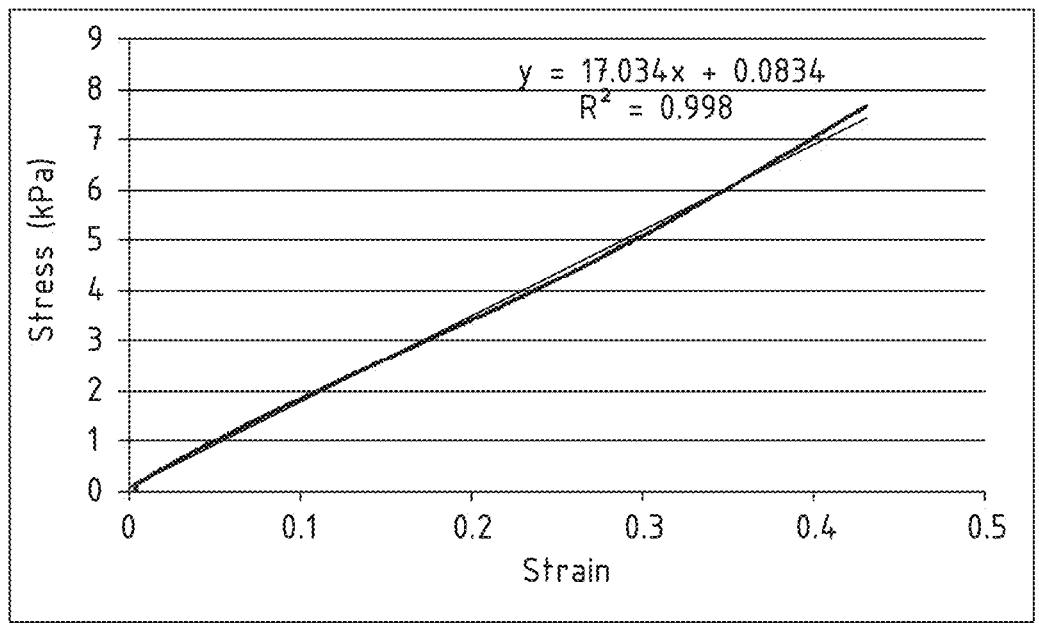
FIG. 9 shows strain versus stress of the auxetic polyurethane foam achieved by experiment 3.

FIG. 8 shows the axial strain versus transverse strain of the auxetic polyurethane foam achieved by experiment 3, and FIG. 9 shows the strain versus stress (kPa) auxetic polyurethane foam achieved by experiment 3. kPa refers to kilo Pascal. FIG. 9 comprises a trend line with the formula of y=17.034x+0.0834 and $R^2$=0.998.

In a preferred embodiment according to the invention experiment 4 was performed. The used reagents and amount are provided in Table 4.

The polyol, surfactant, gelling catalyst, blowing catalyst, and chain extender were mixed at 50 rpm for 1 hour at a temperature between 60° C. to 70° C., providing a reaction mixture. The blowing agent was added to the reaction mixture and stirred for 2 minutes at 70 rpm at 25° C. To the resulting reaction mixture isocyanate was added, and the mixture was stirred for 20 seconds at The resulting mixture was poured in a mould, wherein the mould was made of wood, had dimensions of 16 cm×16 cm×16 cm, and a wall thickness of 1.5 cm. The mixture was left in the mould for 10 minutes and for 24 hours to cure outside the mould. No external compression of the reaction mixture was performed and it was allowed to contract. The contraction was achieved by the formation of polymer network(s) in the foam, thus leading to shrinkage of the foam.

The obtained auxetic polyurethane foam substrate comprises foam outer dimensions after complete shrinkage and curing of 11.5 cm×11.5 cm×8 cm, a Poisson's ratio in the range of −3 to 0.

TABLE 4 reagents used in experiment 4

| Reagent | Description of reagent | Amount (part by weight) |
|---|---|---|
| polyol | Arcol 1107 | 100 gram |
| gelling catalyst | Kosmos 29 | 0.31 pphp* |
| blowing catalyst | Tegoamine 33 | 0.21 pphp* |
| chain extender | Anhydrous Glycerol | 1.11 pphp* |
| chain extender | Methyltrimethoxysilane | 2.53 pphp* |
| blowing agent | Ultra-pure Water | 4 pphp* |
| isocyanate | Desmodur T80 | 42.77 gram |

*pphp = parts per hundred grams of polyol by weight

In a preferred embodiment according to the invention experiment 5 was performed. The used reagents and amount are provided in Table 5.

The polyol, surfactant, gelling catalyst, blowing catalyst, and chain extender were mixed at 50 rpm for 1 hour at a temperature between 60° C. to 70° C., providing a reaction mixture. The blowing agent was added to the reaction mixture and stirred for 5 minutes at 150 rpm at 25° C. To the resulting reaction mixture isocyanate was added, and the mixture was stirred for 15 seconds at 150 rpm at 25° C.

The resulting mixture was poured in a mould, wherein the mould was made of wood, had dimensions of 16 cm×16 cm×16 cm, and a wall thickness of 3.5 cm. The mixture was left in the mould for 10 minutes and for 24 hours to cure outside the mould. No external compression of the reaction mixture was performed and it was allowed to contract. The contraction was achieved by the formation of polymer network(s) in the foam, thus leading to shrinkage of the foam.

The obtained auxetic polyurethane foam substrate comprises a Poisson's ratio in the range of −3 to 0.

TABLE 5 reagents used in experiment 5

| Reagent | Description of reagent | Amount (part by weight) |
| --- | --- | --- |
| polyol | Arcol 1107 | 100 gram |
| surfactant | Tegostab BF 2370 | 0.506 pphp* |
| gelling catalyst | Kosmos 29 | 0.177 pphp* |
| blowing catalyst | Tegoamine 33 | 0.259 pphp* |
| chain extender | Anhydrous Glycerol | 1.005 pphp* |
| chain extender | Methyltrimethoxysilane | 1.517 pphp* |
| blowing agent | Ultra-pure Water | 4 pphp* |
| isocyanate | Desmodur T80 | 45.03 gram |

*pphp = parts per hundred grams of polyol by weight

In a preferred embodiment according to the invention experiment 6 was performed. The used reagents and amount are provided in Table 6.

The polyol, surfactant, gelling catalyst, blowing catalyst, and chain extender were mixed at 100 rpm for 1 hour at a temperature between 60° C. to 70° C., providing a reaction mixture. The blowing agent was added to the reaction mixture and stirred for 5 minutes at 150 rpm at 25° C. To the resulting reaction mixture isocyanate was added, and the mixture was stirred for 15 seconds at 150 rpm at 25° C.

The resulting mixture was poured in a mould, wherein the mould was made of wood, had dimensions of 16 cm×16 cm×16 cm, and a wall thickness of 1.5 cm. The mixture was left in the mould for 10 minutes and for 24 hours to cure outside the mould. No external compression of the reaction mixture was performed and it was allowed to contract. The contraction was achieved by the formation of polymer network(s) in the foam, thus leading to shrinkage of the foam.

The obtained auxetic polyurethane foam substrate comprises a Poisson's ratio in the range of −3 to 0.

TABLE 6 reagents used in experiment 6

| Reagent | Description of reagent | Amount (part by weight) |
| --- | --- | --- |
| polyol | Arcol 1107 | 100.5 gram |
| surfactant | Tegostab BF 2370 | 0.496 pphp* |
| gelling catalyst | Kosmos 29 | 0.170 pphp* |
| blowing catalyst | Tegoamine 33 | 0.245 pphp* |
| chain extender | Anhydrous Glycerol | 1.0 pphp* |
| chain extender | Methyltrimethoxysilane | 1.524 pphp* |
| blowing agent | Ultra-pure Water | 4 pphp* |
| isocyanate | Desmodur T80 | 45.22 gram |

*pphp = parts per hundred grams of polyol by weight

In a preferred embodiment according to the invention experiment 7 was performed. The used reagents and amount are provided in Table 7.

The polyol, surfactant, gelling catalyst, blowing catalyst, and chain extender were mixed at 100 rpm for 1 hour at a temperature between 60° C. to 70° C., providing a reaction mixture. The blowing agent was added to the reaction mixture and stirred for 5 minutes at 150 rpm at 25° C. To the resulting reaction mixture isocyanate was added, and the mixture was stirred for 15 seconds at 150 rpm at 25° C.

The resulting mixture was poured in a mould, wherein the mould was made of wood, had dimensions of 16 cm×16 cm×16 cm, and a wall thickness of 1.5 cm. The mixture was left in the mould for 10 minutes and for 24 hours to cure outside the mould. No external compression of the reaction mixture was performed and it was allowed to contract. The contraction was achieved by the formation of polymer network(s) in the foam, thus leading to shrinkage of the foam.

The obtained auxetic polyurethane foam substrate comprises foam outer dimensions after complete shrinkage and curing of 10.5 cm×10.5 cm×7 cm, a Poisson's ratio in the range of −3 to 0.

TABLE 7 reagents used in experiment 7

| Reagent | Description of reagent | Amount (part by weight) |
| --- | --- | --- |
| polyol | Arcol 1107 | 100.3 gram |
| surfactant | Tegostab BF 2370 | 2.008 pphp* |
| gelling catalyst | Kosmos 29 | 0.169 pphp* |
| blowing catalyst | Tegoamine 33 | 0.252 pphp* |
| chain extender | Anhydrous Glycerol | 1.009 pphp* |
| chain extender | Methyltrimethoxysilane | 1.510 pphp* |
| blowing agent | Ultra-pure Water | 4 pphp* |
| isocyanate | Desmodur T80 | 45.04 gram |

*pphp = parts per hundred grams of polyol by weight

In a preferred embodiment according to the invention experiment 8 was performed. The used reagents and amount are provided in Table 8.

The first part of polyol, surfactant, gelling catalyst, blowing catalyst, and chain extender were mixed at 100 rpm for 1 hour at a temperature between 60° C. to 70° C., providing a reaction mixture. The second part of polyol and the blowing agent were added to the reaction mixture and stirred for 5 minutes at 300 rpm at 25° C. To the resulting reaction mixture isocyanate was added, and the mixture was stirred for 15 seconds at 300 rpm at 25° C.

The resulting mixture was poured in a mould, wherein the mould was made of cardboard, and had dimensions of 21 cm×21 cm×20 cm. The mixture was left in the mould for 10 minutes and for 48 hours to cure outside the mould. No external compression of the reaction mixture was performed and it was allowed to contract. The contraction was achieved by the formation of polymer network(s) in the foam, thus leading to shrinkage of the foam.

The obtained auxetic polyurethane foam substrate comprises foam outer dimensions after complete shrinkage and curing of 12 cm×12 cm×4.5 cm, a Poisson's ratio in the range of −3 to 0.

TABLE 8 reagents used in experiment 8

| Reagent | Description of reagent | Amount (part by weight) |
|---|---|---|
| first part of polyol | Arcol 1107 | 100 gram |
| surfactant | Tegostab BF 2370 | 4.0025 pphp* |
| gelling catalyst | Kosmos 29 | 0.1485 pphp* |
| blowing catalyst | Tegoamine 33 | 0.153 pphp* |
| chain extender | Anhydrous Glycerol | 1.518 pphp* |
| chain extender | Methyltrimethoxysilane | 2.2565 pphp* |
| blowing agent | Ultra-pure Water | 3.5 pphp* |
| second part of polyol | Arcol 1107 | 101.8 gram |
| isocyanate | Desmodur T80 | 88.08 gram |

*pphp = parts per hundred grams of polyol by weight

In a preferred embodiment according to the invention experiment 9 was performed. The used reagents and amount are provided in Table 9.

The first part of polyol, surfactant, gelling catalyst, blowing catalyst, and chain extender were mixed at 100 rpm for 1 hour at a temperature between 60° C. to 70° C., providing a reaction mixture. The second part of polyol and the blowing agent were added to the reaction mixture and stirred for 5 minutes at 300 rpm at 25° C. To the resulting reaction mixture isocyanate was added, and the mixture was stirred for 15 seconds at 300 rpm at 25° C.

The resulting mixture was poured in a mould, wherein the mould was made of cardboard, had dimensions of 21 cm×21 cm×20 cm. The mixture was left in the mould for 30 minutes and for 48 hours to cure outside the mould. No external compression of the reaction mixture was performed and it was allowed to contract. The contraction was achieved by the formation of polymer network(s) in the foam, thus leading to shrinkage of the foam.

The obtained auxetic polyurethane foam substrate comprises foam outer dimensions after complete shrinkage and curing of 12 cm×12 cm×9.5 cm, a Poisson's ratio of −0.24 up to 20% tensile strain.

TABLE 9 reagents used in experiment 9

| Reagent | Description of reagent | Amount (part by weight) |
|---|---|---|
| first part of polyol | Arcol 1107 | 100 gram |
| surfactant | Tegostab BF 2370 | 4.006 pphp* |
| gelling catalyst | Kosmos 29 | 0.1477 pphp* |
| blowing catalyst | Tegoamine 33 | 0.1493 pphp* |
| chain extender | Anhydrous Glycerol | 1.518 pphp* |
| chain extender | Methyltrimethoxysilane | 2.267 pphp* |
| blowing agent | Ultra-pure Water | 2.667 pphp* |
| second part of polyol | Arcol 1107 | 202.6 gram |
| isocyanate | Desmodur T80 | 129.7 gram |

*pphp = parts per hundred grams of polyol by weight

Figure 10:
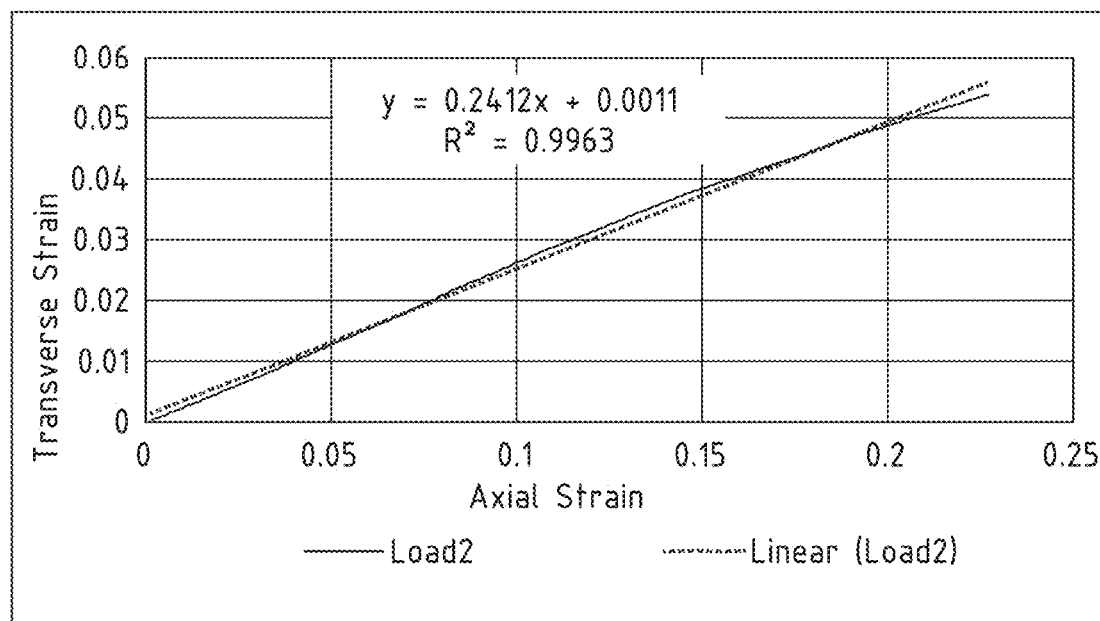
FIG. 10 shows axial strain versus transverse strain of the auxetic polyurethane foam achieved by experiment 9.

FIG. 10 shows the axial strain versus transverse strain of the auxetic polyurethane foam achieved by experiment 9. kPa refers to kilo Pascal. FIG. 10 comprises a trend line with the formula of y=0.2414x+0.0011 and $R^2$=0.9963.

In a preferred embodiment according to the invention experiment 10 was performed. The used reagents and amount are provided in Table 10.

The polyol, surfactant, gelling catalyst, blowing catalyst, and chain extender were added to a 600 millilitre beaker at 25° C., providing a reaction mixture. The blowing agent was added to the reaction mixture and stirred for 2 minutes at 500 rpm at 25° C. To the resulting reaction mixture isocyanate was added, and the mixture was stirred for 10 seconds at 500 rpm at 25° C.

The resulting mixture was poured in a mould, wherein the mould was made of wood, had dimensions of 16.5 cm×16.5 cm×16.5 cm, and a wall thickness of 2.5 cm. The mixture was left in the mould for 30 minutes and for 48 hours to cure outside the mould. No external compression of the reaction mixture was performed and it was allowed to contract.

The obtained auxetic polyurethane foam substrate comprises foam outer dimensions after complete shrinkage and curing of 12 cm×12 cm×7 cm, a density of 112 kg m$^{-3}$, a Poisson's ratio of −0.156 in compression 50% strain and a Young's Modulus in compression up to 5% strain of 28.973 kPa when compressed on its y-axis. Alternatively, when compressed on its x-axis, the auxetic polyurethane foam exhibits a Poisson's ratio of −0.043 in compression up to 50% strain and a Young's Modulus in compression up to 5% strain of 19.50 kPa.

Figure 11:
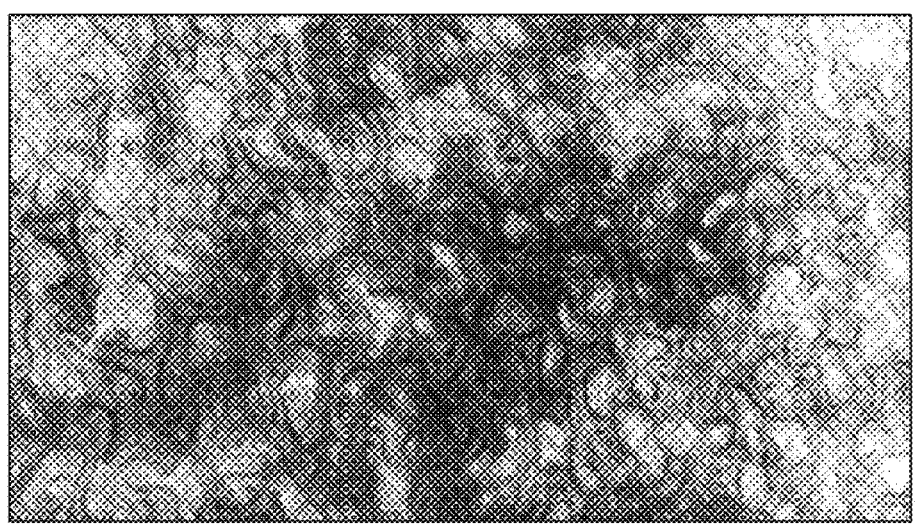
FIG. 11 shows a micrograph of the auxetic polyurethane foam achieved by experiment 10.

FIG. 11 shows a micrograph of the auxetic polyurethane foam achieved by experiment 10.

TABLE 10 reagents used in experiment 10

| Reagent | Description of reagent | Amount (part by weight) |
|---|---|---|
| polyol | Arcol 1107 | 200 gram |
| surfactant | Tegostab BF 2370 | 5.031 gram |
| gelling catalyst | Kosmos 29 | 0.098 gram |
| blowing catalyst | Tegoamine 33 | 0.192 gram |
| chain extender | Anhydrous Glycerol | 0.803 gram |
| blowing agent | Ultra-pure Water | 3 gram |
| isocyanate | Desmodur T80 | 52.8 gram |

Figure 12:
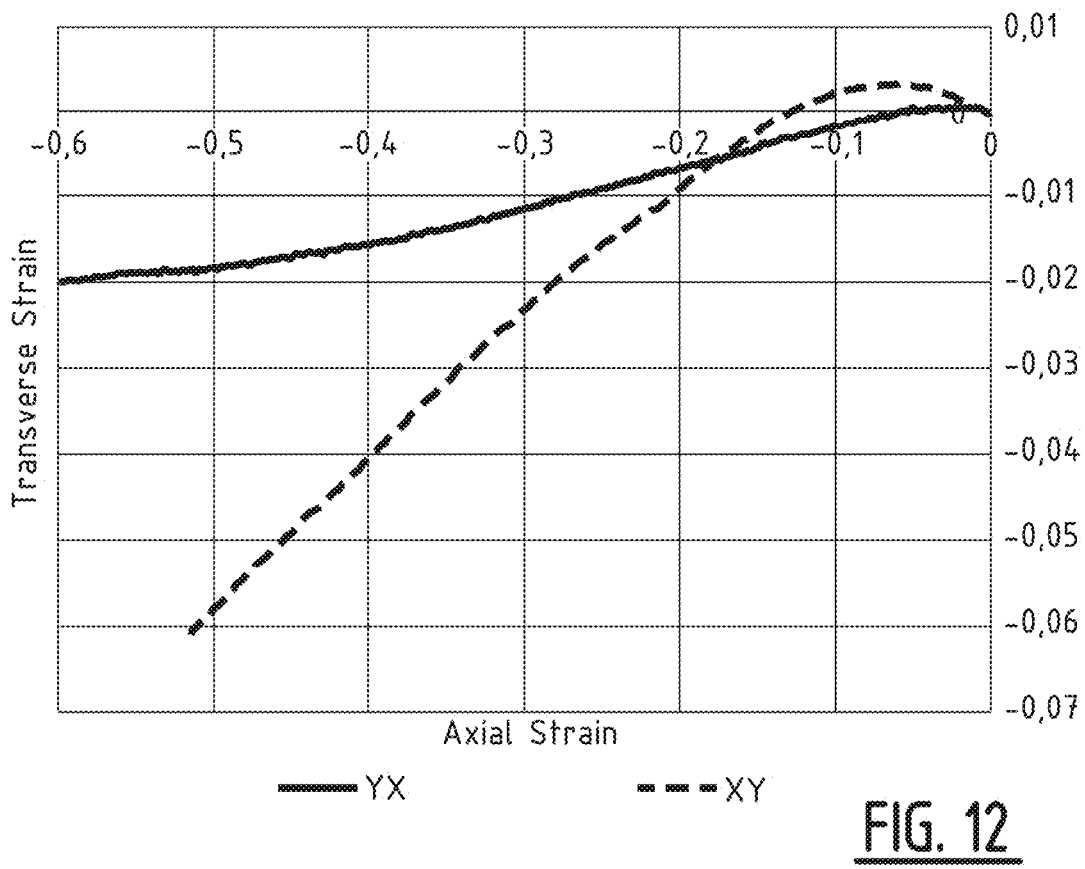
FIG. 12 shows axial strain versus transverse strain of the auxetic polyurethane foam achieved by experiment 10.
Figure 13:
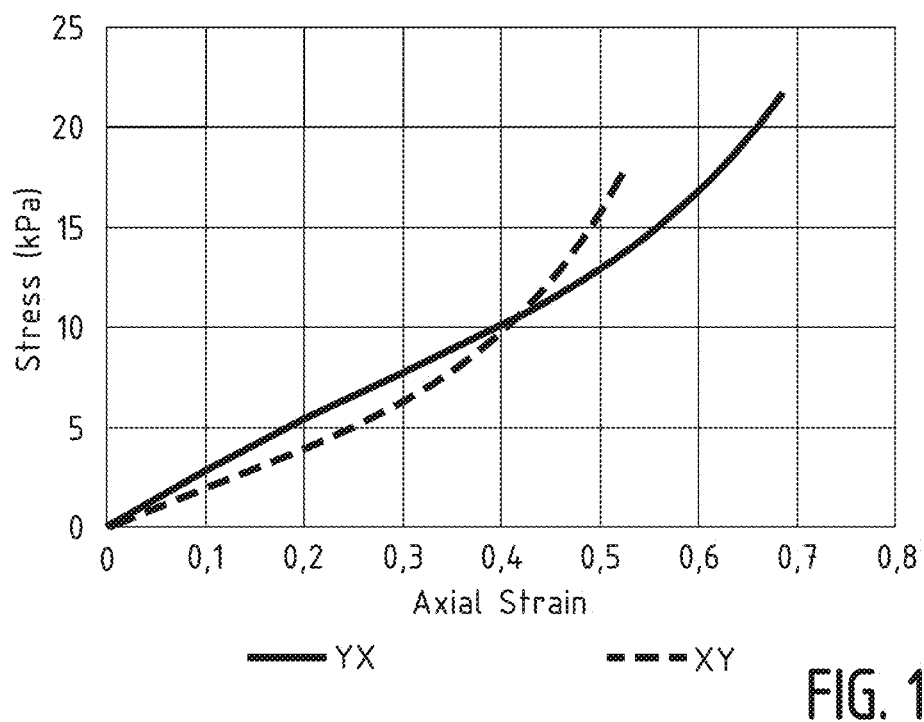
FIG. 13 shows strain versus stress of the auxetic polyurethane foam achieved by experiment 10.

FIG. 12 shows the axial strain versus transverse strain for both loading directions of the auxetic polyurethane foam achieved by experiment 10. FIG. 13 shows the strain versus axial stress (kPa) of the auxetic polyurethane foam achieved by experiment 10.

In a preferred embodiment according to the invention experiment 11 was performed. The used reagents and amount are provided in Table 11.

The polyol, surfactant, gelling catalyst, blowing catalyst, and chain extender were added to a 1 litre beaker at 25° C., providing a reaction mixture. The blowing agent was added to the reaction mixture and stirred for 5 minutes at 500 rpm at 25° C. To the resulting reaction mixture isocyanate was added, and the mixture was stirred for 20 seconds at 500 rpm at 25° C.

The resulting mixture was poured in a mould, wherein the mould was made of expanded polystyrene, had dimensions of 20 cm×20 cm×30 cm, and a wall thickness of 3.5 cm. The mixture was left in the mould for 24 hours and for four days to cure outside the mould. No external compression of the reaction mixture was performed and it was allowed to contract.

The obtained auxetic polyurethane foam substrate comprises foam outer dimensions after complete shrinkage and curing of 14.5 cm×14.5 cm×21 cm, a density of 160 kg m$^{-3}$, a Poisson's ratio of −0.639 in compression up to 20% strain, a Young's Modulus in compression up to 5% strain of 23.93 kPa.

TABLE 11 reagents used in experiment 11

| Reagent | Description of reagent | Amount (part by weight) |
| --- | --- | --- |
| polyol | Arcol 1107 | 400.0 gram |
| surfactant | Tegostab BF 2370 | 10.003 pphp* |
| gelling catalyst | Kosmos 29 | 0.09775 pphp* |
| blowing catalyst | Tegoamine 33 | 0.101 pphp* |
| chain extender | Anhydrous Glycerol | 0.4045 pphp* |
| blowing agent | Ultra-pure Water | 1.75 pphp* |
| isocyanate | Desmodur T80 | 166.8 grams |

*pphp = parts per hundred grams of polyol by weight

Figure 14:
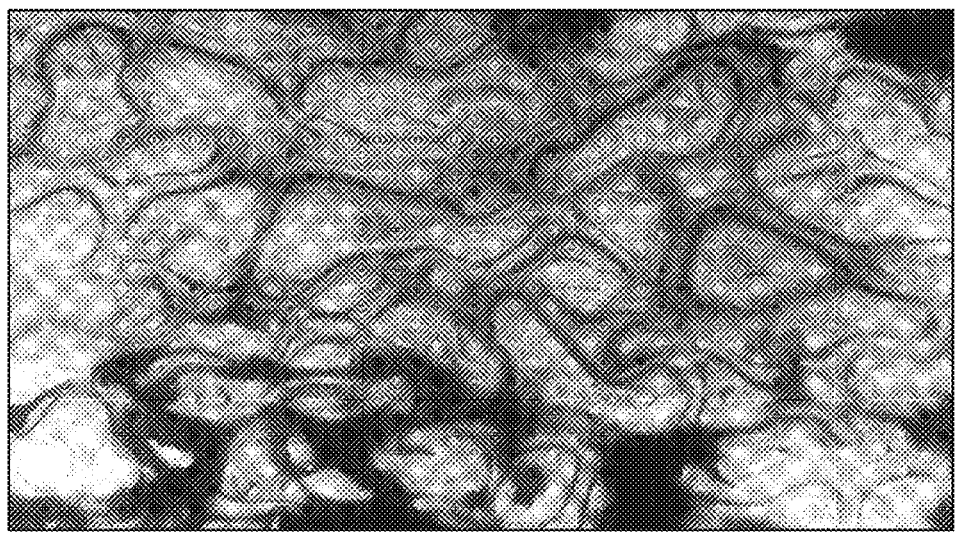
FIG. 14 shows a micrograph of the auxetic polyurethane foam achieved by experiment 11.

FIG. 14 shows a micrograph of the auxetic polyurethane foam achieved by experiment 11.

Figure 15:
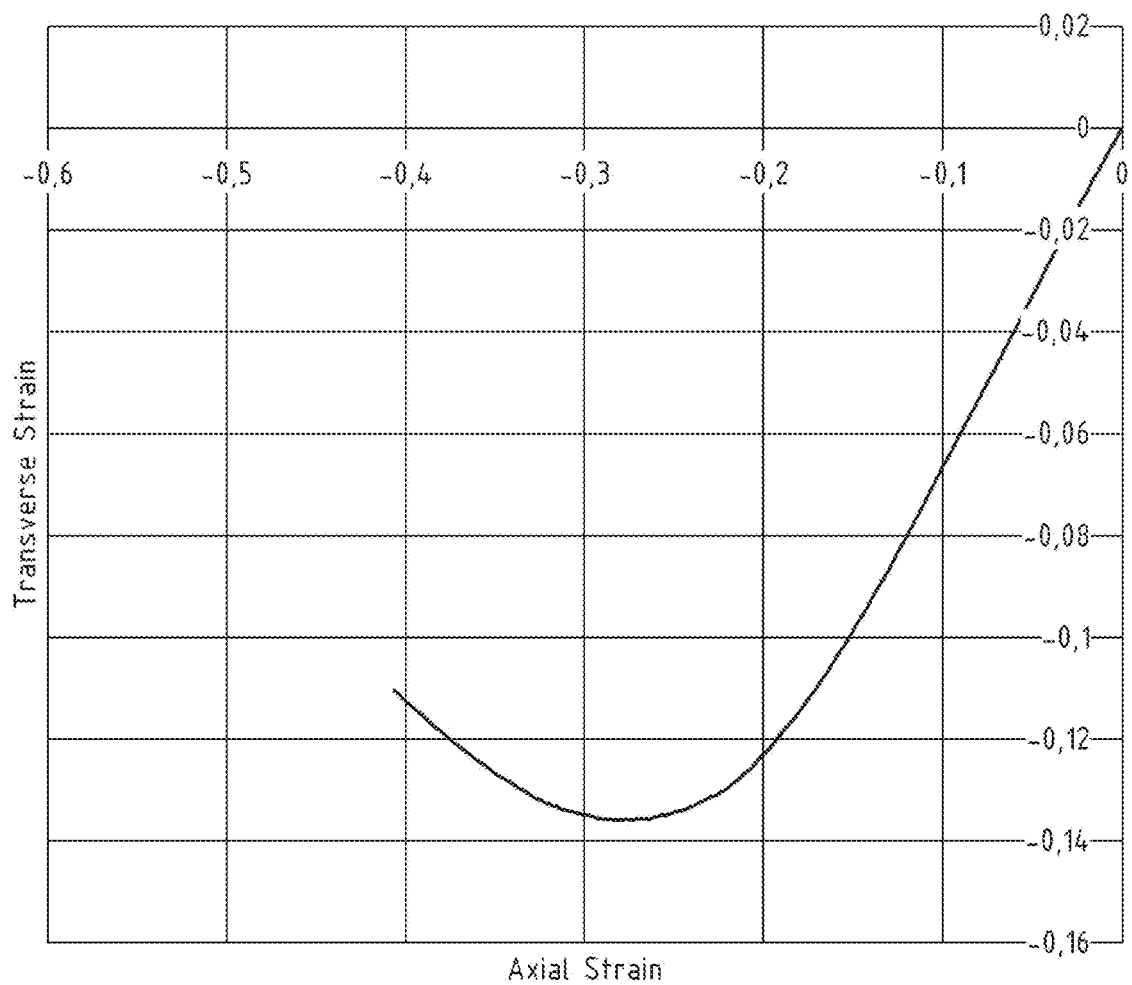
FIG. 15 shows axial strain versus transverse strain of the auxetic polyurethane foam achieved by experiment 11.
Figure 16:
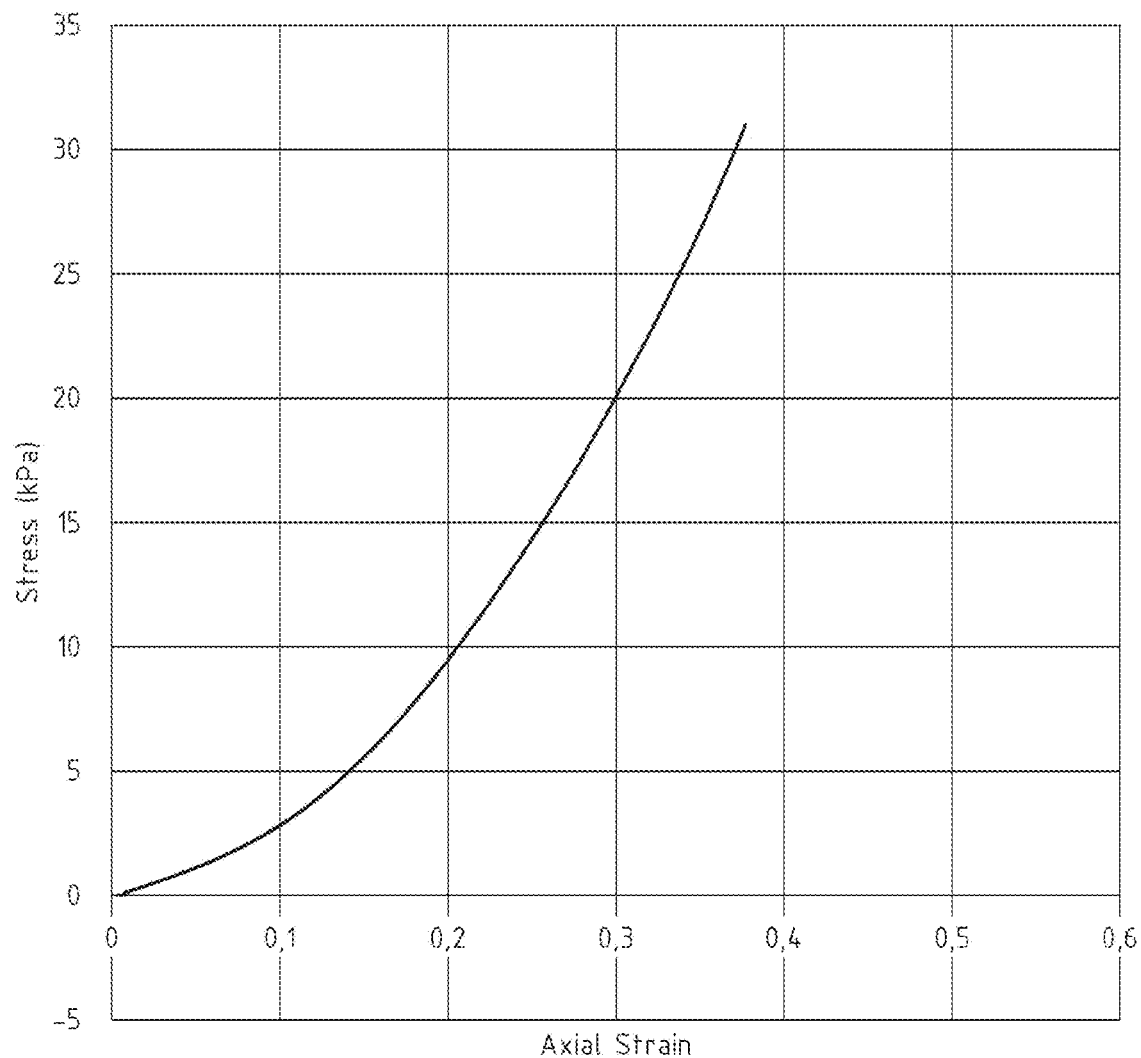
FIG. 16 shows strain versus stress of the auxetic polyurethane foam achieved by experiment 11.

FIG. 15 shows the axial strain versus transverse strain of the auxetic polyurethane foam achieved by experiment 11, and FIG. 16 shows the strain versus stress (kPa) auxetic polyurethane foam achieved by experiment 11.

In a preferred embodiment according to the invention experiment 12 was performed. The used reagents and amount are provided in Table 12.

The polyol, surfactant, gelling catalyst, blowing catalyst, and chain extender were added to a 1 litre beaker at 25° C., providing a reaction mixture. The blowing agent was added to the reaction mixture and stirred for 2 minutes at 900 rpm at 25° C. To the resulting reaction mixture isocyanate was added, and the mixture was stirred for 15 seconds at 900 rpm at 25° C.

The resulting mixture was poured in a mould, wherein the mould was made of expanded polystyrene, had dimensions of 20 cm×20 cm×30 cm, and a wall thickness of 5 cm. The mixture was left in the mould for 24 hours and for four days to cure outside the mould. No external compression of the reaction mixture was performed and it was allowed to contract.

The obtained auxetic polyurethane foam substrate comprises foam outer dimensions after complete shrinkage and curing of 17 cm×17 cm×27 cm, a density of 52.5 kg m$^{-3}$. When loading in the y-direction, the resultant auxetic polyurethane foam sample exhibits a Poisson's ratio of −0.205 in compression up to 15% strain and a Young's Modulus in compression up to 5% strain of 21.9 kPa. When loading in the z-direction, the resultant auxetic polyurethane foam sample exhibits a Poisson's ratio of −0.253 in compression up to 35% strain and a Young's Modulus in compression up to 5% strain of 24.3 kPa.

TABLE 12 reagents used in experiment 12

| Reagent | Description of reagent | Amount (part by weight) |
| --- | --- | --- |
| polyol | Arcol 1107 | 400.1 gram |
| surfactant | Tegostab BF 2370 | 2.500 pphp* |
| gelling catalyst | Kosmos 29 | 0.0975 pphp* |
| blowing catalyst | Tegoamine 33 | 0.0245 pphp* |
| chain extender | Anhydrous Glycerol | 0.4043 pphp* |
| blowing agent | Ultra-pure Water | 1.85 pphp* |
| isocyanate | Desmodur T80 | 127.5 grams |

*pphp = parts per hundred grams of polyol by weight

Figure 17:
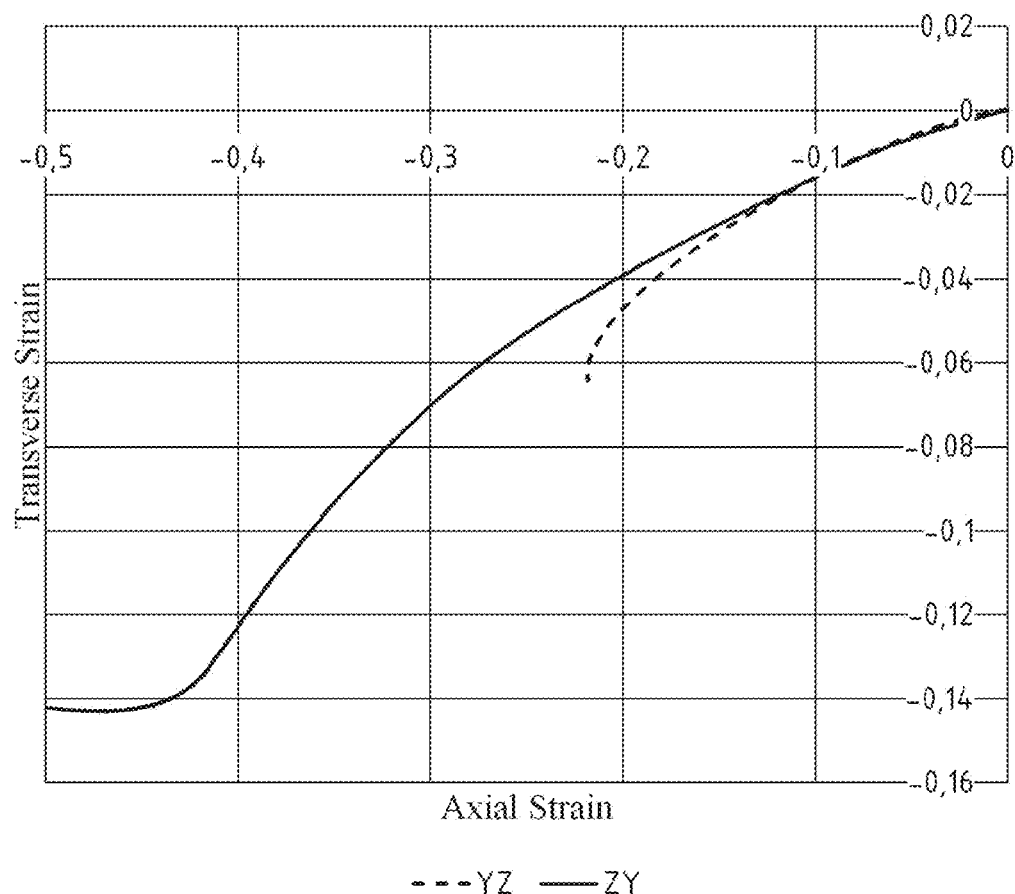
FIG. 17 shows axial strain versus transverse strain of the auxetic polyurethane foam achieved by experiment 12.
Figure 18:
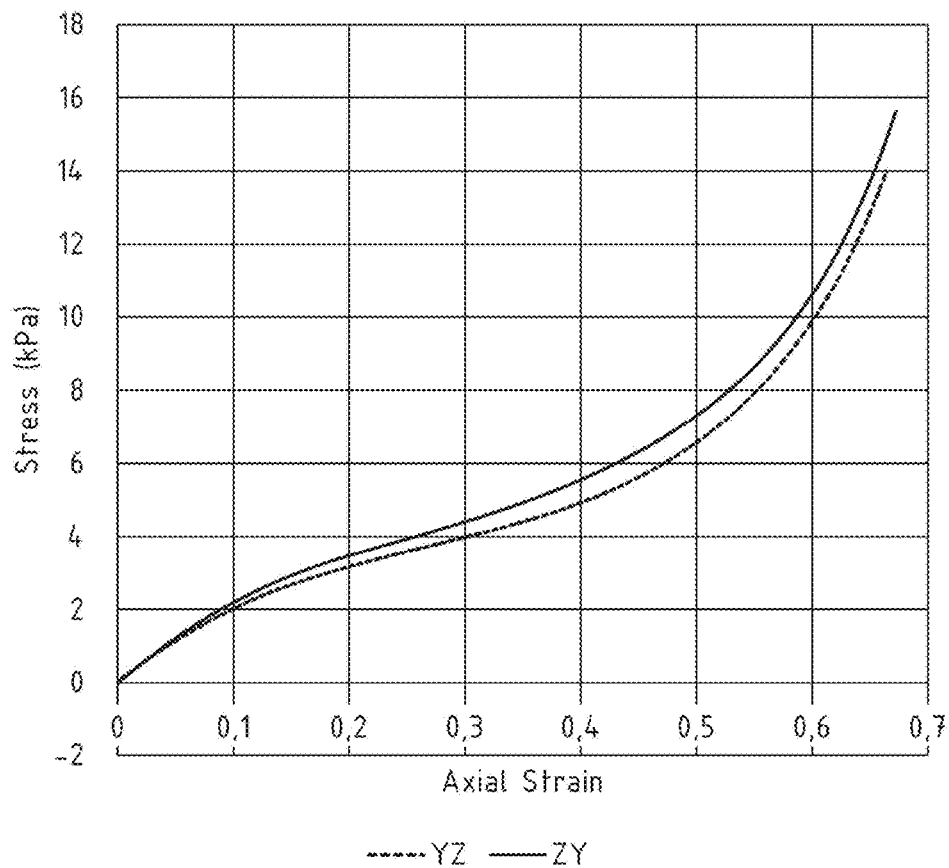
FIG. 18 shows strain versus stress of the auxetic polyurethane foam achieved by experiment 12.

FIG. 17 shows the axial strain versus transverse strain for both loading directions of the auxetic polyurethane foam achieved by experiment 12, and FIG. 18 shows the strain versus stress (kPa) for both loading directions auxetic polyurethane foam achieved by experiment 12. kPa refers to kilo Pascal.

The present invention is by no means limited to the above described preferred embodiments and/or experiments thereof. The rights sought are defined by the following claims within the scope of which many modifications can be envisaged.

The invention claimed is:

1. A method to prepare an auxetic polyurethane foam with a defined cell structure in a single foaming process, comprising the steps of:
    a. mixing a polyol reagent and a foaming reagent to form a homogeneous reaction mixture suitable for forming a homogeneous auxetic polyurethane foam, such that the foaming reagent facilitates the formation of auxetic polyurethane foam by enabling the reaction mixture to expand and polymerize;
    b. mixing an isocyanate with the homogeneous reaction mixture, the isocyanate being selected and provided in an amount to cause the homogeneous reactive mixture to undergo foaming and polymerization to form a polyurethane network having closed cells and/or partially closed cells and/or pre-stressed ribs that contribute to contraction during cooling and enable the formation of a defined cellular structure with buckled ribs, delaying a cure of the reactive mixture and increasing the elasticity of the reactive mixture;
    c. permitting the reactive mixture of step (b) to expand within a mold and/or on a conveyer, wherein the expansion forms a polymer network that includes closed cells that contract as the polymer network cools;
    d. allowing the expanded reaction mixture at least partly to cool within the mold and/or on the conveyor to induce contraction at least partially caused by negative pressure from the trapped gases in the closed cells, and/or applying external compressive forces to the expanded mixture during or after contraction;
    wherein the contraction and/or the compression promotes cell buckling and changing of the initial cellular structure to a defined cellular structure with the closed cells having cellular ribs or struts protruding inward and/or outward prior to finalization of chemical cross-linking and physical curing; and
    e. after the contraction and/or the compression, allowing the compressed and/or contracted reaction mixture of step (d) to cure, wherein the curing process causes the defined cellular structure to form a defined auxetic polyurethane foam structure characterized by a Poisson's ratio in the range of −3 to 0.

2. The method according to claim 1, wherein the foaming reagent is one or more selected from the group consisting of a blowing catalyst, a blowing agent, a gelling catalyst, a surfactant, a chain extender, and a cross-linker.

3. The method according to claim 1, further comprising adding water to the reaction mixture before step b.

4. The method according to claim 1, further comprising the steps of:
    (i) initiating the reaction mixture of step b to form an initiated reaction mixture prior to step c; and
    (ii) initiating expansion and rising of the initiated reaction mixture of step (i) prior to step c.

5. The method according to claim 1, further comprising the step of pouring the reaction mixture onto a moving conveyer as part of a continuous line.

6. The method according to claim 1, wherein the steps a and b are independently performed by vigorously agitating, wherein vigorously agitating comprises a rotation speed of an agitator, and wherein the rotation speed for each of the steps a and b is in the range of 10 rpm to 5000 rpm.

7. The method according to claim 1, wherein step a is performed for at most 8 hours.

8. The method according to claim 1, wherein step a is performed at a temperature of less than 100° C.

9. The method according to claim 1, wherein step b is performed between 1 second to 130 seconds.

10. The method according to claim 3, wherein adding water to the reaction mixture before step b is performed by vigorously agitating the reaction mixture and the water between 1 second to 40 minutes.

11. The method according to claim 1, wherein the polyol reagent is one or more selected from the group consisting of polyether polyol, polyester polyol, polyamine polyol, polyamide polyol, polythioester polyol, polythioether polyol, and solid support polyol.

12. The method according to claim 1, wherein the isocyanate of formula I is provided

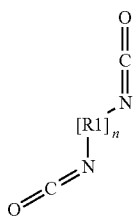

wherein $R_1$ comprises an alkyl group and/or aromatic group.

13. The method according to claim 1, wherein the isocyanate is one or more selected from the group consisting of tolylene-2,4-diisocyanate, tolylene-2,6-diisocyanate, methylene diphenyl diisocyanate, p-phenylene diisocyanate, dicyclohexylmethane diisocyanate, 1,5-naphthylene diisocyanate, O-tolidine diisocyanate, and isophorone diisocyanate.

14. The method according to claim 2, wherein the blowing catalyst comprises a tertiary amine, wherein the tertiary amine is one or more selected from the group consisting of triethylenediamine, 1,3,5-tris-(3-[dimethyl-amino] propyl)-hexa-hydro-1,3,5-triazine, bis(2-dimethylaminoethyl)ether, N,N-dimethylcyclohexylamine, 2,2'-dimorpholinodiethylether, N,N-dimethylethanolamine, N,N-dimethylaminoethoxyethanol, N,N,N',N'',N''-pentamethyldiethylenetriamine, N,N-dimethylaminoethoxyethanol, 2,2'-dimorpholinodiethylether, and N,N'-dimethylpiperazine; and/or wherein the blowing agent is one or more selected from the group consisting of water, chlorofluorocarbons, hydrochlorofluorocarbons, hydrofluorocarbons, hydrocarbons, isopentane, cyclopentane, nitrogen, argon, carbon dioxide, helium, xenon, neon, and air; and/or wherein the gelling catalyst comprises an organometallic catalyst, wherein the gelling catalyst is one or more selected from the group consisting of stannous octoate, stannous neodecanoate, dibutyltindilaurate, and potassium acetate; and/or wherein the surfactant is siloxane derivatives and/or oxyalkylene derivatives; and/or wherein the chain extender and/or cross-linker is one or more selected from the group consisting of alcohols, amines, alkoxysilanes, thiols, and thioesters.

15. The method according to claim 14, wherein the chain extender and/or cross-linker is one or more selected from the group consisting of the glycerol, diethanolamine, triethanolamine, ethylene-oxide capped trimethylolpropane, 2-(methylamino)ethanol, ethylene glycol, methyltrimethoxysilane, and dimethoxydimethylsilane.

* * * * *